United States Patent [19]

Burke, Jr. et al.

[11] 4,012,350

[45] Mar. 15, 1977

[54] LIQUID ADHESIVE FROM PHENOPLAST AND M-AMINOPHENOL

[75] Inventors: Oliver W. Burke, Jr., Fort Lauderdale; Barbara P. Hunt, Pompano Beach, both of Fla.

[73] Assignee: Oliver W. Burke, Jr., Fort Lauderdale, Fla.

[22] Filed: Dec. 7, 1973

[21] Appl. No.: 422,777

Related U.S. Application Data

[62] Division of Ser. No. 219;173, Jan. 19, 1972, Pat. No. 3,922,468.

[52] U.S. Cl. .................. 260/29.3; 260/29.2 EP; 260/29.7 N; 260/51.5; 260/833; 260/846
[51] Int. Cl.² ........................................ C08L 61/14
[58] Field of Search .................................. 260/29.3

[56] References Cited

UNITED STATES PATENTS

| | | | |
|---|---|---|---|
| 3,018,207 | 1/1962 | Danielson | 154/52 |
| 3,507,689 | 4/1970 | Freytag | 117/138.8 |
| 3,698,935 | 10/1972 | Yurcick et al. | 117/76 T |
| 3,719,724 | 3/1973 | Freeman | 260/828 |

*Primary Examiner*—Murray Tillman
*Assistant Examiner*—A. H. Koeckert
*Attorney, Agent, or Firm*—Hall & Houghton

[57] ABSTRACT

The strength of the bond obtained between substrates with the aid of phenoplasts, modified phenoplasts and/or epoxy resins, e.g. between fibrous material and an elastomer on vulcanization thereof, is improved by applying, to at least one of the substrates, in addition to a preformed phenoplast, modified preformed phenoplast, and/or preformed epoxy resin, and drying thereon before the assembly thereof with the other substrate, as an adhesion promoter, a quantity of m-aminophenol, which may be blended in a phenoplast adhesive, such as an RF dip or an RFL dip, or may be blended in the elastomer latex used for forming an RFL dip. Adhesive/promoter blends and latex/promoter blends for forming the same are also disclosed.

15 Claims, No Drawings

LIQUID ADHESIVE FROM PHENOPLAST AND M-AMINOPHENOL

This is a division of application Ser. No. 219,173, filed Jan. 19, 1972, now U.S. 3,922,468.

BACKGROUND OF THE INVENTION

1. Field of the Invention

This invention pertains to the adhering of substrates to one another, and is particularly but not exclusively applicable to the adhering of fibrous material to elastomers, more particularly with the aid of adhesive dips dried on the fibrous material before assembly to the elastomer and vulcanization thereof; and to the provision of adhesive compositions therefor.

2. State of the Prior Art

It is known to pretreat various substrates, e.g. fibrous material, with adhesive resorcinol formaldehyde resin (RF) dips, with such RF dips containing a proportion of elastomer latex (RFL dips), and/or with epoxy resin dips, and to dry the same on the fibrous material before assembling the same with another substrate, e.g. a vulcanizable elastomer and curing the same, for the purpose of providing a bond between the substrates, and especially between a vulcanizate and the fibrous material. Examples of such treatments are disclosed in British Patent No. 1,141,807 published Feb. 5, 1969.

BRIEF SUMMARY OF THE INVENTION

The present invention aims to promote or increase the strength of the bond obtained between substrates with the aid of phenoplasts, modified phenoplasts and-/or epoxy resins, e.g. between fibrous material and an elastomer on vulcanization thereof, and this object is accomplished in accordance with the present invention, by applying to the substrate, in addition to a preformed phenoplast, modified preformed phenoplast, and/or preformed epoxy resin, and drying thereon before the assembly thereof with the other substrate, as an adhesion promoter, a quantity of m-aminophenol selected according to definition 15 hereinafter, which may be blended in a phenoplast adhesive, such as an RF dip or an RFL dip, or may be blended in the elastomer latex used for forming an RFL dip, and such blends constitute useful combinations embraced in the invention.

Definitions

In the following detailed description generic and subgeneric terms are employed according to the following definitions:

1. Rubber or elastomer. The terms "rubber," "rubber material," "elastomer," and "elastomer material" are used herein to designate elastomeric material or rubbery materials including natural rubbers and the synthetic rubbers which are capable of being cured or vulcanized, as by the aid of heat and suitable vulcanizing agents. The vulcanizing agents, depending on the particular elastomer, may be of the sulfur type and/or of the free radical type, e.g., the peroxide or hydroperoxide type, and/or of other types. Such rubbers include homopolymers and copolymers of conjugated dienes such as polychloroprene, polybutadiene, polyisoprene and copolymers of chloroprene, butadiene and isoprene with vinyl monomers, such as the copolymers of butadiene-styrene, butadiene-acrylonitrile and the like, copolymers of isobutylene and isoprene (the butyl rubbers), copolymers of ethylene and propylene, terpolymers of ethylene, propylene and a non-conjugated diene and other elastomers, e.g. fluorocarbon elastomers, as Viton B or Fluorel.

The term "vulcanizable elastomer" as used herein designates a rubber compounded with suitable compounding ingredients including a vulcanizing agent so as to be capable of being cured or vulcanized, as by the aid of heat. The vulcanizable elastomer may be applied in any suitable manner, e.g. by calendering, pressing in a mold or deposition from an aqueous or solvent dispersion.

2. Fibrous Materials. The generic term "fibrous material" as used herein is applicable to natural and synthetic fibrous materials, e.g. reinforcing material in the form of filament, yarn, cord, cable, ribbon, and cord fabric unwoven or woven as cloth or canvas to be used in reinforcing rubber articles such as vehicle tires, mechanical rubber goods such as belts, hose, gaskets, and the like, or as carrier sheet for adhesive material for interposition between other substrates to be bonded together thereby. Such fibrous materials may consist of cotton, cellulose acetate, organic esters and ethers of cellulose, rayon, polyesters such as ethylene glycol terephthalic acid polyesters (Dacron), the polyvinyls and/or polyvinylidenes, such as the acrylonitrile polymers (Orlon), polyvinyl chloride and vinylidene chloride polymers (Vinyon), the polyethylenes and other polyolefins, the polyurethanes (Perluran), the proteins (Caslen), alginates, mineral fibers (fiberglass), polyamides, such as the aliphatic dicarboxylic acid-polyamide reaction products (nylon) and polyvinyl alcohol and combinations of two or more different fibers e.g. in the same yarn or fabric.

The sub-generic term "polyester fiber" as used herein and in the art (see H. Ludewig "Polyester Fasern Chemie and Technologie," published by Akademie Verlag, Berlin, Germany, 1965 herein incorporated by reference) connotes fibers of linear polymeric polyesters containing the ester linkage in the main chain. Such fibers include those produced by reacting glycols such as ethylene glycol, propylene glycol, methoxypropylene glycol with carboxylic acids and typical of these is Dacron, which is a polyethylene glycol ester of terephthalic acid.

The sub-generic term "polyamide fiber" as used herein and in the art (see H. Klare, E. Fritzsche and V. Grobe "Synthetische Fasern aus Polyamiden Technologie and Chemie," published by Akademie Verlag, Berlin, Germany, 1963, herein incorporated by reference) designates the synthetic fiber-forming polyamides. Such polyamides are for example those produced by the condensation of a dicarboxylic acid and a diamine, typically exemplified by polyhexamethylene adipamide (nylon 66), polyhexamethylene sebacamide (nylon 610), polyhexamethylene dodecanediamide (nylon 612) and polycaproamide (nylon 6).

The sub-generic term "glass fiber" as used herein applies to continuous glass fibers and discontinuous glass fibers in the form of filaments, strands, yarns, bundles, cords and fabrics formed therefrom and includes crimped and uncrimped fibers, strands, yarns and threads and those which have been plied or twisted in multiple groups to form yarns, cords or fabrics, this term includes such glass fibers coated with sizing compounds or bonding agents or coupling agents or anchoring agents. Illustrative of such coating agents are organic trivalent chromium compounds e.g. methacrylato chromic chlorides or stearato chromic chloride; titanium complexes e.g. titanium tetraesters; silane and siloxane compounds e.g. the vinyl and allyl trialkoxy silanes, the aminoalkyl and acryloxyalkyl trialkoxy silanes, and other organic silicone compounds described in U.S. Pat. Nos. 3,484,223, 2,563,288, 2,688,006, 2,688,007, 2,723,211, 2,742,378, 2,754,237, 2,776,910, 2,799,598, 2,832,754, 2,930,809, 2,946,701, 2,952,576, 2,974,062, 3,044,982, 3,045,656, 3,169,884, 3,207,623, 3,211,684, and 3,459,585, herein incorporated by reference.

3. Epoxy Resins and Epoxy Resin Coatings.

The term "epoxy resin" as used herein connotes a component for coating substrates, e.g. fibrous materials, consisting essentially of organic material having at least 2 epoxy groups, i.e.

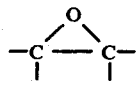

groups per molecule, or of such material in combination with diisocyanate material, e.g. "Hylene MP" commercially available from the duPont Company. Such epoxy resins may be obtained by reacting for example epichlorohydrin with a polyhydric phenol such as bis-(4-hydroxyphenyl)-2,2-propane, bis-(hydroxyphenyl) methane. Examples of such compounds are described in U.S. Patents 2,324,483; 2,444,333; 2,494,295; 2,500,600; 2,511,913; 2,943,095; 2,872,427; 3,488,314; 1,888,358; 2,943,095; and 3,525,703 herein incorporated by reference; and the commercially available epoxy-resins are included hereunder as for example the ERL resins sold by the Union Carbide Corporation under the trade names "ERL 2774," "ERL 3794," "ERL 2794," "ERL 4289," and "ERL 2774," the Epon resins, sold by the Shell Chemical Company, i.e., Epon 1001, Epon 1004, Epon 1007, Epon 1009, Epon 815 and Epon 828; the Araldite resins sold by the Ciba Company, Inc. designated as Araldite 6010, Araldite 502 and Araldite 6020; and GenEpoxy Resins sold by General Mills Chemical Division, i.e. GenEpoxy 175, 190, 525 and M-180, and others. The epoxy resin compounds which are insoluble in water may be supplied as a dip in the form of a solvent solution or an aqueous emulsion or a colloidal dispersion.

4. Dips. The term "dip" as used herein connotes aqueous or non-aqueous solutions, suspensions or emulsions which may be applied to substrate material by dipping, spraying, padding or other suitable procedures, followed by drying.

5. Dried or Drying. The term "dried" or "drying" as used herein includes drying at ambient temperatures and/or elevated temperatures under atmospheric, subatmospheric or elevated pressures, in air or other, e.g. inert, atmosphere; and at the elevated temperatures is preferably accompanied by partial curing of the components by heat and/or with the aid of curative ingredients.

6. Epoxy Resin Coating. The term "epoxy resin coating" as used herein means a coating, preferably at least partially cured, of epoxy resin on the substrate material. For forming an epoxy resin coating, an epoxy resin may be applied to a substrate material as a dip in any suitable manner, e.g. per se or as a solution in a volatile solvent such as acetone, methyl ethyl ketone, or chloroform or as a water emulsion or dispersion, and preferably is then at least partially cured, preferably with the aid of a curative of the acid or basic catalyst type, with the latter being preferred. Typical of such catalysts are those set forth in U.S. Pat. No. 2,872,427, herein incorporated by reference, such as ethylene diamine, diethylene triamine, triethylene tetramine, dicyandiamide, melamine, pyridine, cyclohexylamine, benzyldimethylamine, benzylamine, diethylaniline, triethanolamine, piperidine, tetramethyl piperazine, N,N-dibutyl-1,3-propane diamine, N,N-diethyl-1,3-propane diamine, 1,2-diamino-2-methylpropane, 2,7-diamino-2,6-dimethyloctane, dibutylamine, dioctylamine, dinonylamine, distearylamine, diallylamine, o-tolylnaphthylamine, pyrrolidine, 2-methylpyrrolidine, tetrahydropyridine, 2-methylpiperidine, diaminopyridine, tetraethylpentamine, meta-phenylene diamine, and salts of such amines, and other epoxy resins and catalysts as described in H. Lee and K. Neville's treatise entitled "Handbook of Epoxy Resins," herein incorporated by reference.

7. Phenoplasts. The term "phenoplast" or "phenoplasts" as used herein connotes those resins which are basic catalyzed reaction products of a phenol and an aldehyde (i.e. the resoles and resitols) and those resins which are acid catalyzed reaction products of a phenol and an aldehyde (e.g. the novolacs). Thus the term "phenoplasts" is used in the accepted sense as set forth in the treatise entitled "Phenoplasts" by T. S. Carswell published in 1947 by Interscience Publishers, Inc., New York, N. Y., which treatise is herein incorporated by reference.

Suitable phenols to form the phenoplasts hereof include phenol; dihydric phenols such as resorcinol; substituted phenols such as the alkylated phenols exemplary of which are m-cresol, o-cresol, m-ethylphenol, m-n-propylphenol, m-isopropylphenol, m-n-hexylphenol, m-n-butyl phenol, m-sec.-butyl phenol, m-tert.-butyl phenol, m-amyl phenol and other like phenols, particularly those wherein the alkyl substituent contains from 1 to 9 carbon atoms inclusive; the meta-substituted phenols such as m-aminophenol, resorcinol monoacetate, 1,5-naphthalenediol and the like; meta-substituted alkoxy phenols such as m-methoxy phenol, m-ethoxy phenol, m-n-propoxy phenol and the like, particularly those wherein the alkoxy group contains from 1 to 6 carbon atoms inclusive; as well as those phenols with similar substituents in the para-position (e.g. p-tert.-butyl phenol) which are suitable for forming novolacs; the polyhydric polynuclear phenols which consist of two or more phenols connected by such groups as methylene, alkylene or sulfone, such as bis(p-hydroxyphenyl)-methane, 2,2-bis(p-hydroxyphenyl) propane and dihydroxydiphenyl sulfone and the like; and the halogenated phenols and polynuclear phenols including the meta-halogenated phenols such as m-chlorophenol, m-bromophenol and the like.

The monohydric, mononuclear phenols suitable to form the phenoplasts herein can be represented by the following formula:

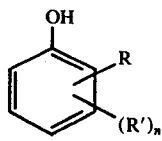

wherein R is an alkyl radical containing from 1 to 9 carbon atoms inclusive or an alkoxy radical containing from 1 to 6 carbon atoms inclusive; R' is a halogen atom, i.e. chlorine, bromine, iodine or fluorine; and n is an integer having a value of 0 to 1 inclusive.

Suitable aldehydes to form the phenoplasts hereof include formaldehyde in any of its available forms, (i.e., formalin, paraformaldehyde and trioxane), furfural, glyoxal, acrolein and the like.

8. Novolac Resins. The terms "novolac" or "novolac resin" are used herein in the accepted sense employed in T. S. Carswell's treatise "Phenoplasts" referred to above. Thus, the novolac resins are well known phenoplast products which are usually acidcatalyzed phenol aldehyde condensates, and which are prepared by condensing a phenol and an aldehyde in the presence of an acid such as oxalic acid, sulfuric acid, hydrochloric acid and the like or in the presence of a metal salt of an acid such as zinc acetate, wherein the phenol is present in the reaction mixture in more than stoichiometric amounts. Novolac resins can be converted to the infusible state by the addition thereto of a crosslinking agent such as a methylene generating agent such as hexamethylenetetramine.

The following commercial resin used in certain of the examples hereinafter are reported to be novolac resins:

a. The trademark product Durez 12686, a cashew nut oil modified phenolic novolac resin (used in Table XX, examples 75–78), b. the trademark product Durez 22193, a thermoplastic resin cured with the aid of a polyamide resin (used in Examples 83–85, Table XXII);

c. the trademark product Penacolite R-2170, a 75% aqueous solution of a resorcinolformaldehyde condensation product requiring the addition of a methylene donor to become thermo-setting (used in Examples 79–82, Table XXI).

9. Methylene donor. The term "methylene donor" as used herein includes those compounds which provide methylene linkages in reacting with soluble or plastic or heat softenable phenoplasts, e.g. A-stage resins (resoles) or B-Stage resins (resitols), or novolacs to form cross-linked insoluble, infusable resins, e.g. C-stage resins (resites). Such methylene donor material include hexamethylenetetramine (hexa), as well as formaldehyde, which term includes formaldehyde and various polymeric forms thereof such as paraformaldehyde, trioxane and the like.

10. RF Resin. The term "resorcinol formaldehyde resin" or "RF resin" as used by the trade and herein means an acid or basic catalyzed phenolic resin which consists essentially of the reaction product of a substituted phenol and an aldehyde, heat hardening per se or with the aid of a methylene donor and/or metal oxide. Suitable substituted phenols include phenols having substituents selected from the groups consisting of -OH, -NH$_2$ or -OCOCH$_3$ groups, such as resorcinol, m-aminophenol, resorcinol monoacetate, 1,5-naphthalenediol and other typical phenols employed to form phenolic type adhesives and combinations of such phenols. Suitable aldehydes for the reaction include furfural, acrolein, glyoxal, and especially formaldehyde which may be employed as formalin (37% by weight formaldehyde gas in water), and combinations of two or more thereof. The resin forming reaction is preferably carried out in water with the aid of an alkali metal hydroxide or carbonate such as sodium hydroxide or sodium carbonate; or with aqueous ammonia; or with a water soluble or dispersible amine such as monoethanolamine, diethanolamine, triethanolamine, and/or the unsaturated amines such as diallylamine, triallylamine, and the vinylamine monomers, e.g. t-butylaminoethyl methacrylate and dimethylaminoethyl methacrylate. The RF resin may be applied to the fibrous material or pretreated fibrous material in the form of a dip and dried thereon as above described.

11. Phenoplasts modified with Modifying Polymer

In connection with adhesive compositions herein, the terms "phenoplasts modified with modifying polymers" or "modified phenoplasts" are used to refer to "phenoplasts" plus "modifying polymers," e.g. synthetic rubbers and thermoplastic resins which may be employed to improve flexibility and adhesion to particular substrates, including but not limited to natural rubber; polybutadiene; polyisoprene; polychloroprene; butadiene/acrylonitrile, butadiene/vinyl pyridine, butadiene/styrene/vinyl pyridene, butadiene/styrene, isobutylene/isoprene, and other hydrocarbon diene/-vinylidene interpolymers; ethylene/propylene and other alpha olefin polymers and interpolymers; the foregoing polymers and interpolymers provided with carboxyl groups; and combinations of two or more of the foregoing. Thus the modified phenoplasts include compositions comprising phenoplasts and modifying resins selected from the class consisting of the members of the following groups:

1. polychloroprene (Neoprene elastomer);
2. butadiene-acryonitrile copolymers (nitrile elastomers);
3. butadiene-styrene copolymers;
4. thermosetting or curing epoxy resins;
5. thermoplastic vinylidene resins, including vinyl resins, e.g. polyvinylformal resins;
6. thermoplastic polyamide resins;
7. other known polymeric materials suitable as modifiers for phenoplasts;
8. combinations of two or more of the foregoing polymeric modifiers. See "Adhesives Guide" by Joyce Hurd, B.S.I.R.A. Research Report M-39, 1959, The Cable Printing and Publishing Co., Ltd., London, herein incorporated by reference.

12. Adhesive Composition. The term "adhesive composition" as used herein includes phenoplasts with and without modifying polymer dispersed in a liquid dispersing medium, or carried by a carrier sheet. In the liquid dispersion form it is exemplified by the resorcinol formaldehyde (RF) dips, and the resorcinol formaldehyde elastomer latex (RFL) dips. The adhesive composition is applied as a liquid dispersion in a liquid dispersing medium and said liquid is preferably a volatile organic liquid such as an aliphatic or aromatic hydrocarbon, an alcohol such as ethanol, propanol, isopropanol or the like, or a ketone such as acetone, methylethyl ketone, diethyl ketone or the like and most preferably the liquid dispersing medium is aqueous. When the adhesive composition is aqueously dispersed then a cationic or anionic and/or non-ionic dispersing agent may be employed. The liquid dispersed adhesive phenoplast (modified or unmodified) compositions, in uncured or partially cured form may be applied to a substrate, which may be selected from the class consisting of plastic film, woven fabrics, non-woven fiber sheeting, and metal foil, and may be dried thereon for application as a sheet to be interposed between substrates to be joined by curing thereof. The liquid dispersed epoxy resin adhesives may be similarly applied except that they must be at least partially cured before being contacted with the m-aminophenol promoter.

13. RFD Dips. The RF resin is preferably employed with an elastomer latex and such combination is referred to by the trade and herein as "RFL" or as an RFL dip. The elastomer latices employable in such RFL combinations include natural Hevea latex, natural rubber latices grafted with vinyl compounds such as methyl methacrylate, vinylpyridine, etc., and various synthetic rubber latices such as homopolymer latex of a $C_4$ to $C_{10}$ conjugated diene compound, and copolymer latices obtained by the copolymerization of a $C_4$ to $C_{10}$ conjugated diene with one or more vinyl monomers such as styrene, vinylpyridine, acrylonitrile, acrylic acid, methacrylic acid, alkyl acrylates and alkyl methacrylates and the like, e.g. styrene-butadiene copolymer latex, polybutadiene latex, polyisoprene latex, polychloroprene latex, isopreneisobutylene copolymer latex, butadiene-acrylonitrile copolymer latex, butadiene-methacrylic acid copolymer latex, butadiene-styrene-acrylic acid copolymer latex, and a preferred elastomer latex is a vinylpyridine latex, usually used in combination with another elastomer latex, for example as described in U.S. Pat. No. 2,561,215, herein incorporated by reference, wherein the vinylpyridine latex comprises an aqueous dispersion of a copolymer of 50 to 95 percent by weight of a conjugated diolefin having 4 to 6 carbon atoms, 5 to 40 percent of a vinylpyridine, and 0-40 percent of a styrene, and suitable vinylpyridines are 2-vinylpyridine, 2-methyl-5-vinylpyridine and 5-ethyl-2-vinylpyridine. Such a vinylpyridine latex is commercially available as "Gen-Tac," a trademark product of General Tire and Rubber Co., which is reported to be a vinylpyridine latex consisting of a copolymer of 70% butadiene, 15% styrene and 15% 2-vinylpyridine having a total solids content of around 40 percent. It is usually desirable to blend the vinylpyridine latex with an SBR rubber latex as for example a blend of 70 to 80% of an SBR rubber latex and 20 to 30% by weight of the vinylpyridine latex. The elastomer latex component of an RFL dip may be added to a preformed RF resin as an aqueous dispersion, or the RF resin may be prepared in the presence of the elastomer latex. The RFL dip may be applied to the fibrous material or pre-treated fibrous material and be dried thereon as above described.

14. Adhesion Promoter. The "adhesion promoter" of the present invention is m-aminophenol as hereinafter defined, applied in conjunction with an adhesive used to bond together composite structures and/or substrates and said adhesive preferably being a phenoplast resin with or without modifying polymer. In particular applications such adhesive promoter is applied to fibrous materials in a manner to improve the bond strength developed between the fibrous material and an elastomer material by a dried epoxy resin and/or RF or RFL resin composition.

15. M-aminophenol. The term "m-aminophenol" as used in the present invention connotes m-aminophenol (i.e. 3-aminophenol or m-hydroxyaniline) and its salts with acids having an appreciable water solubility, i.e. including the "water soluble acids" which include "water soluble mineral acids" and "water soluble organic acids", and these unresinified materials are distinguished from and do not include aldehyde reaction products preformed therefrom which are RF resins under definition (10) above. The water soluble mineral acids comprise sulfuric acid, hydrochloric acid, and the like. The water soluble organic acids comprise, but are not limited to, the water soluble, aliphatic monocarboxylic acids, e.g., the alkenoic acids of 1 to 3 carbon atoms (formic, acetic, and propanoic) and the water soluble, hydroxylalkanoic acids such as hydroxyacetic acid, 2-hydroxypropanoic acid, 3-hydroxypropanoic acid, the hydroxybutanoic acids, 2,3-dihydroxypropanoic acid, and citric, oxalic, malonic, maleic, fumaric, acrylic, methacrylic acids and the like. The m-aminophenol may be applied to a substrate prior to, concurrently with, or subsequently to the application thereto of the preformed phenoplast, and the material may be dried thereon sequentially or concurrently to prepare the composition.

16. Substrate. The term "substrate" as used herein refers to any solid material, e.g. fibrous material, sheet material, structural elements of wood, metal and/or plastic, including but not limited to, the fibrous or sheet material as set out under (2) and (12) above to which the adhesive compositions of the present invention may be applied and dried in uncured condition, and which may become a part of a composite structure when the adhesive composition is cured.

17. Composite structure. The term "composite structure" as used herein connotes any structure comprising a plurality of substrate elements or members assembled with adhesive material according to the invention.

Detailed Description

In a first aspect of the method category of this invention, in the formation of a bond by vulcanizing a vulcanizable elastomer to a fibrous material with the aid of an adhesive dip of resorcinol formaldehyde resin with or without a quantity of elastomer latex dried on the fibrous material before assembly with the elastomer and vulcanization thereof, which fibrous material may also have been treated with a dip of epoxy resin and dried, to improve the bond there is also applied to the fibrous material, and dried thereon before such assembly, a dip of m-aminophenol. The ratios of the coating components on the fibrous material applied as individual or combined component dips are preferably as follows: epoxy resin (dry basis) 0-2 parts by weight; resorcinol formaldehyde resin (dry basis) 1 part by weight; elastomer latex (dry basis) 0-15 parts by weight; m-aminophenol (dry basis) 0.1 to 4 parts by weight. In the single or combined component dips a quantity of water or volatile solvent is employed in such proportion that the dry solids content of the dip is preferably in the range of 0.1% to 10% by weight.

In particular procedural embodiments of the invention the adhesive dip of resorcinol-formaldehyde resin and the m-aminophenol dip may be at least in part applied to the fibrous material and dried thereon concurrently; or the adhesive dip of resorcinol formaldehyde resin and the m-aminophenol dip may be at least in part applied to the fibrous material and dried thereon sequentially; or at least a part of the m-aminophenol dip may be applied to and dried on the fibrous material after the drying thereon of the adhesive dip of resorcinol formaldehyde resin.

In certain embodiments of the invention the fibrous material is selected from the class of fibrous materials suitable for use as tire cord consisting of the polyamide fibers, the polyester fibers and the glass fibers, with or without said fibrous material having been pre-treated with an epoxy resin dip and dried.

In an embodiment of its product aspect the invention provides a composite structure consisting essentially of a vulcanizable elastomer vulcanizate bonded to a fibrous material with the aid of an adhesive from a resorcinol formaldehyde resin dip with or without a portion of elastomer latex, particularly characterized in that the bonding of said adhesive is augmented by m-aminophenol applied to and dried on the fibrous material prior to its assembly with the elastomer and vulcanization thereof; and in another embodiment the invention provides a composite structure consisting essentially of a vulcanizable elastomer vulcanizate bonded to a fibrous material with the aid of epoxy resin adhesive and an adhesive from a resorcinol-formaldehyde resin dip with or without a portion of elastomer latex, particularly characterized in that the bonding of said adhesives is augmented by m-aminophenol applied to and dried on the fibrous material prior to its assembly with the elastomer and vulcanization thereof.

Also as useful subcombinations the invention provides:

A. An improved adhesive composition for bonding substrates to one another, said adhesive composition being a liquid dispersion comprising, by weight, the combination of:
  a. 5 to 250 parts of liquid dispersing medium,
  b. 10 parts of phenoplast material selected from the members of the class consisting of group (I) the heat curable phenoplasts containing methylol groups; group (II) the mixtures of (1) novolac phenoplasts substantially free from methylol groups with (2) at least sufficient methylene donor material to enable heat curing of the same; group (III) mixtures of (1) phenoplasts which complex with metal oxides with (2) at least sufficient material selected from the oxides and hydroxides of the metals calcium, magnesium and zinc, to complex with the phenoplast; and (4) heat curable combinations of the foregoing,
  c. 0 to 150 parts of modifying polymer, and
  d. 0 to 30 parts of material selected from the oxides and hydroxides of the metals calcium, magnesium, and zinc,
the said composition being improved in that it has mixed therein
  e. 1 to 40 parts by weight of m-aminophenol.

B. A composite structure comprising a substrate having such improved adhesive composition applied thereto; and especially one in which the so applied composition has been substantially freed of said liquid dispersing medium.

C. An adhesive material for bonding substrates to one another, said adhesive material consisting essentially of
  a. a vehicle, and carried thereby, dry basis by weight, a mixture of
  b. 10 parts of heat curable phenoplast,
  c. 0 to 150 parts of elastomer,
  d. 0 to 50 parts of inorganic material selected from the oxides and hydroxides of the metals calcium, magnesium and zinc,
  e. 0 to 40 parts of donor material and
  f. 1 to 40 parts of m-aminophenol;
and especially such an adhesive material wherein said vehicle is selected from the class consisting of volatile liquid and non-volatile solid carriers.

D. An aqueous adhesive composition comprising a mixture, dispersed in the aqueous phase, dry basis by weight, of
  a. 1 part phenoplast resin,
  b. from 0 to 2 parts epoxy resin,
  c. from 0 to 15 parts elastomer latex, and
  d. from 0.1 to 4.0 parts m-aminophenol; and especially such an aqueous adhesive composition which contains as component (a) a resorcinol/formaldehyde phenoplast, and as component (c) from 0.5 to 15 parts vinyl pyridine latex, and/or which contains from 0.2 to 2.0 parts epoxy resin.

E. An improved elastomer latex composition for use in preparing modified phenoplast adhesive compositions which consist essentially, dry basis by weight, of
  a. 15 parts elastomer latex, and
  b. from 0.1 to 4.0 parts m-aminophenol; and especially such an improved composition in which at least 0.5 parts of the elastomer latex is a vinylpyridine latex, a polychloroprene latex, a butadiene-acrylonitrile latex, a latex of polychloroprene having carboxyl substituents, or a latex of butadiene-acrylonitrile polymer having carboxyl substituents, or a combination of two or more such latices.

F. A composition for use in forming phenoplast adhesive compositions which consists essentially of a mixture of hexamethylemetetramine and m-aminophenol in the proportions by weight of from about 1 to 40 to about 40 to 1.

In more detail in certain embodiments of this invention one of the substrates, e.g. a fibrous material is bonded to the other substrate, e.g. a compounded elastomer with the aid of an adhesive system in which the adhesives are selected from the class of adhesives resins consisting of the epoxy resins, RF resins, RFL resins and combinations of such resins; and with m-aminophenol as adhesion promoter; and the examples hereinafter typify various embodiments of the invention. Among these embodiments are those employing the m-aminophenol as an adhesion promoter in the following sequences and combinations:
  i. fibrous material - epoxy resin[1] - m-aminophenol[2] - elastomer compound[6];
  ii. fibrous material - epoxy resin[1] - m-aminophenol[2] - RF resin or RFL resin[3] - elastomer compound[6];
  iii. fibrous material - epoxy resin[1] - m-aminophenol[2] - RF resin or RFL resin[3] - m-aminophenol[4] - elastomer compound[6];
  iv. fibrous material - epoxy resin[1] - m-aminophenol[2] - RF resin or RFL resin plus m-aminophenol[5] - elastomer compound[6];
  v. fibrous material - epoxy resin[1] - RF resin or RFL resin[3] - m-aminophenol[4] - elastomer compound[6];
  vi. fibrous material - epoxy resin[1] - RF resin or RFL resin plus m-aminophenol[5] - elastomer compound[6];
  vii. fibrous material - m-aminophenol[2] - Rf resin or RFL resin[3] - elastomer compound[6];
  viii. fibrous material - RF resin or RFL resin[3] - m-aminophenol[4] - elastomer compound[6];
  ix. fibrous material - RF resin or RFL resin plus m-aminophenol[5] - elastomer compound[6];
  x. fibrous material - epoxy resin plus RF resin or RFL resin - m-aminophenol[7] - elastomer compound[6].

(1) The epoxy resin preferably plus catalyst as a volatile organic solvent solution or as an aqueous emulsion is applied to the fibrous material and preferably at least partially cured thereon.
(2) The m-aminophenol is applied to the fibrous material from a volatile organic solvent solution or from an aqueous solution and dried with or without a heat treatment step.
(3) The RF resin or RFL resin is applied as an aqueous dispersion to the fibrous material (with or without epoxy resin coating) and dried.
(4) The m-aminophenol is applied from a volatile organic solvent solution or from an aqueous solution to the treated fibrous material.
(5) The RF or RFL resin as aqueous dispersion with m-aminophenol is applied to the fabric material and dried; and the resorcinol formaldehyde resin is prepared in aqueous dispersion with the aid of perferably a basic catalyst, e.g. sodium hydroxide, ammonia or the amines; and if elastomer latex is employed it can be added prior, during or after formation of the RF resin to form the RFL resin; however, the m-aminophenol to act as an adhesion promoter must be added after the RF resin or RFL resin has formed or may be added with the latex when it is added to the performed RF resin, in which case a performed mixture as set out under (E) above is an especially useful subcombination.

The modes of realizing and embodying each of the foregoing aspects and procedures of the invention are set forth in detail in the examples 1–62, which are to be taken as illustrative and not restrictive of the invention, the scope of which is more particularly pointed out in the appended claims.

EXAMPLES 1–62

The following Examples are their tabulations demonstrate applicant's discovery of the effect of m-aminophenol as an adhesive promoter in improving the bond strength between fibrous material and elastomer material when bonded with an epoxy resin and/or with a rescorcinol formaldehyde resin with or without elastomer latex, in each of the above noted aspects, as indicated in connection with the respective groups or tables thereof.

Examples 1-8 (Table I)

This group of Examples comprises working examples bearing B numbers and comparative or control Examples bearing A numbers, the B numbered examples employing the invention; and the last two columns showing by Footnote continued:
(6) The elastomer compound is contacted or bonded to the adhesive treated fibrous material preferably with the aid of pressure as by pressing in a mold or by calendaring or by other contacting means and the combination is cured.
(7) In this system a dip is prepared by combining the following components: (a) resins (as resin(as aqueous dispersion) (b) RF resin or RFL resin (as aqueous dispersion) and applied to the fibrous material and dried (drying includes without or with heating at elevated temperature e.g. 30 minutes at 165°C.) Then a dip of m-aminophenol is applied and dried. comparison with the A examples the improvements effected thereby. In these Examples polyester fabrics are prepared for adhering to polychloroprene by coating a fabric such as Dacron with an emulsion of epoxy resin and a selected curative, then letting the coating on the fibrous material dry and curing it for 30 minutes at 163° C. In the B Examples such epoxy resin coated Dacron is then after-treated with an aqueous solution of m-aminophenol, allowed to dry, and laminated to a compound Neoprene rubber sheet and cured for 45 minutes at 165° C., and a high tensile strength bond occurs between the Dacron and the Neoprene. If the m-aminophenol step is omitted, as in the control or A Examples, they peel strength of the laminate is considerably lowered.

Examples 1 through 8 set forth in Table I also illustrate that the advantages of the invention are not dependent on the type of curative used for curing the epoxy resin, or on the level of curative employed. For this purpose four different amine curative each at a high and low level were added to the aqueous emulsion of the epoxy resin of diglycidyl ether of bisphenol A.

When reference is made in the Tables to the "unaged peel strength" this means the peel strength determined on a sample which has not been subjected to the aging effect of prolonged immersion in hot water, e.g. 14 days, prior to the peel strength test.

Preparation of Epoxy Resin Emulsions

In Table I-A recipe I is set forth for the preparation of epoxy resin emulsions as follows: the epoxy resin and a small amount of non-ionic emulsifier polyoxyethylene sorbitan monosteareate[1] were first dissolved in chloroform, the weight proportion being 20 parts epoxy resin, 2 parts non-ionic emulsifier, and 78 parts chloroform. These were mixed together for about two minutes in a blender, and then agitation was continued at high speed while an aqeous solution of anionic emulsifier[2] was added very slowly. This solution consisted of 2 parts lauryl alcohol sulfate[2] and 98 parts water, and then 200 parts water. Agitation was continued for another 5 minutes and then the emulsion was removed from the blender and diluted with water as desired, usually to provide a 5% epoxy resin solids emulsion.
(1) Tween 60, a Trademark designation of the Atlas Chemical Industries.
(2) Dupon ME, a Trademark designation of E. I. du Pont de Numours and Co. Inc.

When a water-soluble curative for the epoxy resin was to be included in the emulsion it was added, dissolved in water of dilution. When a chloroform-soluble curative such as methylene-bis-orthochloroaniline was to be used, it was added dissolved in a small amount of chloroform, and added to the epoxy resin-chloroform solution at the beginning of the emulsification process, with the weight of curative and chloroform used to dissolve it being substracted from the 78 parts chloroform otherwise used to dissolve the epoxy resin.

Sixteen batches of epoxy emulsion dip were prepared according to recipe I Table I-A employing as epoxy resin a diglycidyl ether of bisphenol A having an epoxy equivalent of about 200 and viscosity about 20,000 cps. In Table I is set forth the amount of curative added to each of these batches e.g. in Example 1A and 1B to the emulsion containing 20 grams of epoxy resin was added 0.68 grams of tetraethylenepentamine.

The amine curing agents were added to the epoxy emulsions from 5% solution of the particular amines in water or a mixture of equal parts by weight of water and isopropanol. All the epoxy emulsion examples with curatives were further diluted with water so as to contain 1% epoxy resin content by weight.

Two proportions each of four different amine compounds were used. These compounds included tetraethylenepentamine, which has both a primary and secondary amine groups; diethanolamine, a secondary amine; and piperidine and dimethylaminomethylphenol (DMP-10, Rohm & Haas Co.) which are tertiary amines. The proportions of these amines as parts by weight per hundred epoxy resin is shown in Table I and was equal to 25% and 100% of proportions commonly used in curing epoxy resins except in the case of tetraethylenepentamine which was used in amounts equal to 25% and 40% of the proportions commonly used in curing epoxy resins.

Pieces of polyethylene terephthalate, (Dacron, E. I. Du Pont de Nemours and Co. Inc.) were soaked for about a minute in various dips as set forth under fabric treatment A, Table I,[1] and then were dried overnight at ambient temperature, followed by heating for 30 minutes at 165° C. to at least partially cure the epoxy resin.
(1) In the Tables an X designates that the captioned material or treatment was used; a dash, that it was not.

Samples of each of these treated fabric were reserved for control or comparative testing while other portions were further tested by dipping into 0.5% aqueous solutions of m-aminophenol as set forth under fabric treatment B, Table I and then dried for 16 hours at ambient temperature, after which they were again cured for 30 minutes at 165° C.

The treated pieces of Dacron and the controls thus prepared were then each press-laminated with a small sheet of uncured polychloroprene compounded according to recipe A, Table IV to provide laminates.

Method of Testing the Strength of Fabric-Elastomer Bonds

Laminates of treated fabrics and elastomer compounds were formed by sandwiching a small rectangular piece of compound (which had been sheeted out on a rubber mill to less than an eighth of an inch in thickness) between two rectangular pieces of treated fabric about 3 by 4 inches in size and the laminates pressed together in a laboratory Carver Press for one minute at about 100° C. and 460 psi. The applied pressure forces the elastomer compound into the weave of the fabric, insuring good contact between fabric and elastomer.

The laminates were the pre-heated 20 minutes at 115° C. followed by curing them (usually for 60 minutes) at 165° C. in an air oven) without weights upon them. After curing and cooling of the laminates, specimens one inch wide were cut therefrom for peel test purposes.

The test for peel strength requires the plies at one end of the specimen to be separated for insertion into the jaws of the testing machine. To facilitate this separation, a masking strip of cellophane tape was placed across one end of one of the pieces of fabric before assembly and lamination with the elastomer compound so that the elastomer at that end adhered to only one sheet of fabric.

Peel strength was determined according to Method 5950 of Federal Specification CCT-191B, except that speed of separation of the jaws of the testing machine (Scott Tester Model L50RR) was 2 inches per minute.

One ply of the specimen was inserted in each clamp and then as the peeling of the specimen progressed, the peel strength in pounds was read directly from the dial of the machine. After values which were though to be unnaturally high due to twisting of the specimen or tearing of the elastomer etc., had been discarded, the five highest values remaining were averaged and the average recorded as initial peel strength in pounds per inch width which values are set forth in Table I and the other tables hereafter.

Specimens to be tested for water-resistance of the adhesive bond were then immersed in an 82° C. water bath for two weeks, after which they were removed, temperatures equilibrated for 30–90 minutes in water at ambient temperature and then tested for peel strength. The data obtained in these tests is presented in Table I, and it may be seen that in every case a secondary treatment of the fabric with a m-aminophenol dip resulted in substantially better peel strength than was obtained with Dacron treated only with epoxy emulsions containing amine curative.

TABLE I

ADHESION OF POLYESTER FABRIC TO POLYCHLOROPRENE
Comparison of Polyester Fabric Coated with Epoxy Resin Cured with Various Curatives,
With and without After-Treatment with m-Aminophenol

| Example No. | Fabric* Treatment A Diglycidyl ether of Bisphenol A** Epoxy Emulsion Dip (Curative for dip) | Epoxy Resin coating (Dry) (16 hrs./ 27° C.) | (Cure) (30 min./ 165° C.) | Fabric* Treatment B Aqueous m-AP Dip (0.5 wt. % m-aminophenol) | After-treatment (Dry) (16 hrs./ 27° C.) | (Cure) (30 min./ 165° C.) | Bonded to Polychloroprene and Tested[4] (Peel Strength)(lb./1" wid.) (Unaged) | (Aged 14 days in 82° water) |
|---|---|---|---|---|---|---|---|---|
| 1 (a) | 3.4 phr TEPA[1] | X | X | — | — | — | 12 | 6 |
| 1 (b) | 3.4 phr TEPA[1] | X | X | X | X | X | 37 | 16 |
| 2 (a) | 20.0 phr TEPA[1] | X | X | — | — | — | 16 | 9 |
| 2 (b) | 20.0 phr TEPA[1] | X | X | X | X | X | 39 | 20 |
| 3 (a) | 3.0 phr DEA[2] | X | X | — | — | — | 9 | 3 |
| 3 (b) | 3.0 phr DEA[2] | X | X | X | X | X | 34 | 14 |
| 4 (a) | 12 phr DEA[2] | X | X | — | — | — | 9.5 | 3 |
| 4 (b) | 12 phr DEA[2] | X | X | X | X | X | 41 | 16 |
| 5 (a) | 2.5 phr DMP-10[3] | X | X | — | — | — | 7 | 5 |
| 5 (b) | 2.5 phr DMP-10[3] | X | X | X | X | X | 38 | 13 |
| 6 (a) | 10 phr DMP-10[3] | X | X | — | — | — | 11 | 3 |
| 6 (b) | 10 phr DMP-10[3] | X | X | X | X | X | 35 | 21 |
| 7 (a) | 1.4 phr piperidine | X | X | — | — | — | 7 | 3 |
| 7 (b) | 1.4 phr piperidine | X | X | X | X | X | 35 | 16 |
| 8 (a) | 5.6 phr piperidine | X | X | — | — | — | 7.5 | 3 |
| 8 (b) | 5.6 phr piperidine | X | X | X | X | X | 32 | 8 |

*Dacron.
**The epoxy resin is a trademark product Araldite 6020, Ciba Products Co. and has an epoxy equivalent of 196-208 and a vis. of 16,000–20,000 cps, and is employed as an aqueous emulsion containing 1.0% epoxy resin solids and curative added to emulsion in phr basis, see Recipe I, Table I-A.
[1]TEPA = tetraethylenepentamine.
[2]DEA = diethanolamine.
[3]DMP 10 = dimethylaminomethylphenol, a trademark product of Rohm & Haas Co.
[4]Compounding recipe (A) Table IV.

TABLE I-A

PREPARATION OF EPOXY EMULSION DIP

| | | Recipe (5% epoxy dip) | I (grams) |
|---|---|---|---|
| (A) | Dissolve Epoxy resin Type[1] Choroform Emulsifier Non-ionic[2] | | 20 Variable 78 2 |
| (B) | Dissolve Emulsifier Anionic[3] Water | | 2 98 |
| (C) | Added (B) to (A) and emulsify[4] | | |
| (D) | Dilute (C) Water | | 200 |
| (E) | Curative | | |

TABLE I-A-continued

PREPARATION OF EPOXY EMULSION DIP

| Recipe<br>(5% epoxy dip) | I<br>(grams) |
|---|---|
| Type(5) | phr* |

*Wt. parts curative per hundred wt. parts of epoxy resin variable.
(1)Epoxy resin type selection variable.
(2)Polyoxyethylene sorbitan monostearate, Tween 60, a trademark designation of Atlas Chemical Industries.
(3)Lauryl alcohol sulfate, Duponol ME a trademark designation of E. I. du Pont de Nemours and Co. Inc.
(4)Waring blender.
(5)Curative type selection variable.

Examples 9 through 12 (Table II)

Two portions of emulsion containing 5% by weight of an epoxy resin (Araldite 6020, Ciba Products Co.) were prepared according to recipe I, Table I-A and diluted with water to 1000 grams containing 2% by weight resin and designated I and II.

To I was added 108 grams of a 2.5% aqueous solution of m-aminophenol as curative for the epoxy resin, i.e. 13.5 parts per hundred of epoxy resin solids. Then enough water was added to dilute the emulsion to 2000 grams and reduce the epoxy solids content to 1% by weight.

To II was added 216 grams of the 2.5% aqueous solution of m-aminophenol as curative for the epoxy resin, equal to 27 parts per hundred of epoxy resin solids. Then enough water was added to dilute that emulsion to 2000 grams and reduce its epoxy solids content to 1% by weight.

A piece of Dacron fabric was dipped into emulsion I containing 13.5 phr (parts per hundred of resin by weight) of m-aminophenol and divided into four pieces and treated as follows: in example 9A a piece of the treated fabric was dried 17 hours at 27° C. and cured 30 minutes at 165° C.; in example 9B a piece of the fabric was treated in the same manner as 9A plus being dipped in an 0.5% by weight aqueous solution of m-aminophenol dried 17 hours at 27° C. and cured 30 minutes at 165° C.; in example 11A a piece of the fabric was prepared identical to 9A except the drying time was 30 minutes at 90° C. instead of 17 hours at 27° C.; in example 11B a piece of the fabric was prepared identically to 11A plus being dipped in an 0.5% by weight aqueous solution of m-aminophenol dried 30 minutes at 90° C. and cured 30 minutes at 165° C.

Another piece of Dacron fabric was dipped into emulsion II containing 27 phr of m-aminophenol and divided into four pieces and treated as follows: in example 10A a piece of fabric was treated exactly like 9A; in example 10B a piece of the fabric was treated exactly like 9B; in example 12A a piece of the fabric was treated exactly like 11A; and in example 12B a piece of the fabric was treated exactly like 11B.

The data given in Table Ii shows that when Dacron is treated with an epoxy resin cured with m-aminophenol and bonded to polychloroprene the strength of such bond can be improved by further treating the dried epoxy coated Dacron by dipping in an aqueous solution of m-aminophenol and drying the resulting coating.

The eight treated fabrics prepared thus were then press-laminated to polychloroprene compound A, Table IV, in a Carver Laboratory press at 100° C. and 460 psi for one minute, and the laminates were heated 20 minutes at 115° C. and then heated 60 minutes in an air oven at 165° C.

The strength of the fabric-elastomer bond was determined as described for examples 1 through 8 heretofore and the data presented in Table II. This data shows that the peel strength of Dacron-neoprene laminates was substantially improved when Dacron fabric already treated with epoxy resin and m-aminophenol combined in an emulsion as curative therefor and at least partially cured, was given a second treatment of a 0.5 aqueous solution of m-aminophenol after such partial curing followed by drying and heat-treatment thereof. Whether the laminate after-treatment I or II was dried 17 hours at ambient temperatures or 30 minutes at 90° C. seemed to have little effect on the peel strength of the laminate except for examples 11A and 11B which had lower values than the corresponding examples 9A and 9B. All the B examples which are after-treated with m-aminophenol exhibited bonds with higher peel strength than the control or comparative A examples prepared without such after-treatment.

TABLE II

ADHESION OF POLYESTER FABRIC TO POLYCHLOROPRENE
Comparison of Polyester Fabric Coated with Epoxy Resin Cured with m-Aminophenol
With and without After-Treatment with m-Aminophenol

| | Fabric* Treatment A | | | Fabric* Treatment B | | | Bonded to Polychloroprene and Tested(1) |
|---|---|---|---|---|---|---|---|
| | Diglycidyl ether of Bisphenol A** | Epoxy Resin Coating | | m-Amino-phenol | After-Treatment | | |
| Example (No.) | Epoxy Emulsion Dip (Curative for dip) | (Drying) | (Cure) (30 min./ 165° C.) | (0.5 wt. % in water) | (Dry) | (Heat) (30 min./ 165° C.) | Peel Strength, lb./1" width (Unaged) |
| | | | (X) | (X) | (X) | (X) | |
| 9 (A) | 13.5 phr m-aminophenol | 17 hrs./27° C. | X | — | — | — | 32 |
| 9 (B) | 13.5 phr m-aminophenol | 17 hrs./27° C. | X | X | 17 hrs./27° C. | X | 48 |
| 10 (A) | 27 phr m-aminophenol | 17 hrs./27° C. | X | — | — | — | 29 |
| 10 (B) | 27 phr m-aminophenol | 17 hrs./27° C. | X | X | 17 hrs./27° C. | X | 35 |
| 11 (A) | 13.5 phr m-aminophenol | 30 min./90° C. | X | — | — | — | 18 |
| 11 (B) | 13.5 phr m-aminophenol | 30 min./90° C. | X | X | 30 min./90° C. | X | 36 |
| 12 (A) | 27 phr m-aminophenol | 30 min./90° C. | X | — | — | — | 25 |
| 12 (B) | 27 phr m-aminophenol | 30 min./90° C. | X | X | 30 min./90° C. | X | 35 |

*Dacron
**The epoxy resin is a trademark product Araldite 6020, Ciba Products Co. and is employed as an aqueous emulsion containing 1.0% epoxy resin solids and curative added to emulsion in phr basis, see Recipe I, Table I-A.
phr = parts by weight per hundred parts by weight of epoxy resin
(1)Compounding recipe (A), Table IV.

Examples 13 through 19 (Table III)

Examples 13 through 19, Table III, present a comparison of 7 epoxy resins which were employed as 1% resin solids solutions in chloroform with all but one having 10 phr of the curative methylene-bis-orthochloroaniline. The solution of the cycloaliphatic epoxy resin of example 16(a) was an exception in that this resin was dissolved in isopropanol and the 1% resin solids solution contained 10 phr tetraethylenepentamine as resin curative.

Pieces of the polyester fabric Dacron were treated with these solutions by immersion and gentle agitation for about a minute, then were dried seventeen hours at 27° C. followed by curing 30 minutes at 165° C. The fabrics were then each divided into two portions, one of which was cured an additional 30 minutes while the other was after-treated in a 0.5% solution of m-aminophenol and dried 16 hours at 27° C. then was heated 30 minutes at 163° C.

Test specimens of each of the treated fabrics were laminated to a polychloroprene compound prepared according to compound A, Table IV and tested by the method described for examples 1 through 8 above.

A description of the various epoxy resins and the peel test data obtained for the treated polyester fabrics are presented in Table III. It is noted that when the polyester fabric is treated with m-aminophenol in treatment step B the peel strength in most instances is more than doubled.

Examples 20 through 27 (Table III-A)

Eight epoxy resins were compared in experiments in which "Dacron" polyester fabric (see examples 20 through 27 of Table III-A), was first soaked for about a minute in a 0.5% solution of the particular resin in chloroform or trichlorethylene, then was dried at about 27° C. until the solvent had evaporated. The fabric was then cured for one hour in a 165° C. air oven.

Each of the epoxy-treated fabrics was then dipped into a 0.5% aqueous solution of m-aminophenol, after which it was dried at about 27° C. for about 16 hours followed by heating for 30 minutes at 165° C.

The adhesion of these treated fabrics to polychloroprene was evaluated by preparing test laminates of the fabrics with a polychloroprene compound (see compound A, Table IV) as described above, and determining the peel strength of specimens cut from the cured laminates. The data obtained from these tests is presented in Table III-A. This table teaches it is unnecessary to coat the polyester fabric with the epoxy resin which contains curative as the epoxy resin can be cured or partially cured to the fabric with heat alone and without curative being present with the epoxy resin.

TABLE III

ADHESION OF POLYESTER FABRIC TO POLYCHLOROPRENE
Comparison of Polyester Fabric Coated with Various Epoxy Resins Cured with Typical Curative,
With and without After-Treatment with m-Aminophenol

| Example No. | Fabric* Treatment A Epoxy Resin Coating 0.5% Epoxy in chloroform plus 10 phr of Curative-methylene-bis-orthchloroaniline** | Resin Cure (30 min./ 163° C.) | Fabric Treatment B m-Aminophenol (0.5% wt. in water) | Dry (16 hrs./ 27° C.) | Heat (30 min./ 163° C.) | bonded to Polychloroprene Compound and Tested[9] Peel Strength, lb./1" width (unaged) |
|---|---|---|---|---|---|---|
| 13 (A) | Diglycidyl ether of bisphenol A[1] | X | — | — | X | 11 |
| 13 (B) | " | X | X | X | X | 38 |
| 14 (A) | Polyglycidyl ether of phenol-formaldehyde resin[3] | X | — | — | X | 18 |
| 14 (B) | " | X | X | X | X | 33 |
| 15 (A) | Resorcinol diglycidyl ether[4] | X | — | — | X | 15 |
| 15 (B) | " | X | X | X | X | 27 |
| 16 (A) | Cycloaliphatic epoxy resin[5]*** | X | — | — | X | 9 |
| 16 (B) | " | X | X | X | X | 37 |
| 17 (A) | Triglycidl ether of glycerol[6] | X | — | — | X | 15 |
| 17 (B) | " | X | X | X | X | 26 |
| 18 (A) | diglycidyl ether of bisphenol A[7] | X | — | — | X | 19 |
| 18 (B) | " | X | X | X | X | 35 |
| 19 (A) | Diglycidyl ether of bispheol A[8] | X | — | — | X | 12 |
| 19 (B) | " | X | X | X | X | 31 |

NOTE: Footnotes (1) and (3) thru (8) same as correspondingly numbered footnotes Table III-A
*Dacron
**MOCA a trademark product of E. I. du Pont de Nemours & Co., Inc.
***This resin was dissolved in isopropanol as 0.5% solution and 10 phr tetraethylenepentamine was added as resin curative in place of MOCA.
[9]Compounding Recipe (A) Table IV.

TABLE III-A

ADHESION OF AFTER-TREATED POLYESTER FABRICS TO VARIOUS ELASTOMERS
Illustrating Adhesions to Polychloroprene in Tables III
are Applicable to Other Elastomers

| Example No. | Fabric* Treatment A Epoxy Resin Coating (0.5% wt. epoxy in chloroform) | Resin Cure (60 min./ 165° C.) | Fabric* Treatment B m-aminophenol (0.5% wt. in water) | (Dry) (17 hrs./ 27° C.) | (Heat) (30 min./ 27° C.) | Bonded to Elastomer (Type) | Peel Strength (lbs./1" width) (Unaged) |
|---|---|---|---|---|---|---|---|
| 20 | Diglycidyl ether of bisphenol A[1] | X | X | X | X | CR[A]** / NBR[B] / SBR[C] | 35 / 44 / 28 |
| 21 | Diglycidyl ether of bisphenol A[2] | X | X | X | X | NBR[B] | 36 |
| 22 | Polyglycidyl ether of pheno-(3) formaldehyde novolak resin | X | X | X | X | NBR[B] | 37 |
| 23 | Resorcinol diglycidyl ether[4] | X | X | X | X | CR[A] | 30 |
| 24 | Cycloaliphatic epoxy resin[5] | X | X | X | X | CR[A] | 37 |
| 25 | Triglycidyl ether of glycerol[6] | X | X | X | X | CR[A] | 35 |
| 26 | Diglycidyl ether of bisphenol A[7] | X | X | X | X | CR[A] | 33 |
| 27 | Diglycidyl ether of bisphenol A[8] | X | X | X | X | CR[A] | 30 |

| | Trademark | Firm | Epoxy Equivalent | Viscosity cps. | |
|---|---|---|---|---|---|
| (1) | Araldite 6020 | Ciba Products Co. | 196–208 | 16,000–20,000 | CR = Polychloroprene |
| (2) | Epon 828 | Shell Chemical Co. | 185–192 | 10,000–16,000 | |
| (3) | EPN 1139 | Ciba Products Co. | 172–179 | 17,000 | |

TABLE III-A-continued

ADHESION OF AFTER-TREATED POLYESTER FABRICS TO VARIOUS ELASTOMERS
Illustrating Adhesions to Polychloroprene in Tables III are Applicable to Other Elastomers

| | | | | | |
|---|---|---|---|---|---|
| (4) | ERE 1359 | Ciba Products Co. | 128 | 500 | NBR = Butadiene-acrylonitrile copolymer |
| (5) | Unox 221 | Union Carbide Co. | 221 | — | |
| (6) | Epon 812 | Shell Chemical Co. | 140–160 | 100–170 | |
| (7) | Araldite 6004 | Ciba Products Co. | 185 | 5000–6000 | SBR = Butadiene-styrene copolymer |
| (8) | Epon 1001 | Shell Chemical Co. | 450–550 | solid | |

*Dacron
**Compounding recipe - see Table IV.

TABLE IV

Elastomer Compounding Recipes

| Compounding Recipe | (A) | (B) | (C) |
|---|---|---|---|
| Polychloroprene[1] | 80 | — | — |
| Polychloroprene[2] | 20 | — | — |
| Polybutadiene-acrylonitrile[3] | — | 100 | — |
| Polybutadiene-styrene[4] | — | — | 100 |
| Phenyl-B-naphthylamine | 1 | 1 | 1 |
| Silica[5] | 30 | — | — |
| Carbon black[6] | — | 25 | — |
| Phenolic resin[7] | — | 30 | 40 |
| Polybutadiene-acrylonitrile[8] | 15 | — | — |
| Stearic acid | — | 1 | 1 |
| Polyethylene[9] | 1 | — | — |
| Hexamethylenetetramine | — | 1.9 | 3.0 |
| Tetramethyl thiuram monosulfide[10] | — | — | 0.2 |
| Sulfur | — | — | 2.0 |
| Red Lead (98% $Pb_3O_4$) | 10 | — | — |
| Cure | | | |
| Temp. 165° C. (X) | X | X | X |
| Time, min. | 45 | 60 | 45 |

[1]Neoprene GNA - a trademark product of E. I. du Pont de Nemours and Co., Inc.
[2]Neoprene WB - a trademark product of E. I. du Pont de Nemours and Co., Inc.
[3]Hycar 1002 - a trademark product of B. F. Goodrich Chemical Co.
[4]SBR-1502
[5]Hi-Sil 233 - a trademark product of Pittsburgh Plate Glass Co.
[6]Philblack A - a trademark product of Phillips Petroleum Co.
[7]Durex 12686 - a trademark product of Hooker Chemical Corp.
[8]Poly B-D resin CN-15 - a trademark product of Atlantic Richfield Co.
[9]A/C Polyethylene 617A - a trademark product of Allied Chemical Corp.
[10]Monex - a trademark product of Uniroyal, Inc.

Examples 28 through 35 (Table V)

Examples 28 through 35 Table V are derived from an experiment with a single piece each of cotton and nylon 66 fabric were first treated by dipping them into an emulsion prepared according to recipe I, Table I-A and containing 1% by weight solids of a diglycidyl ether of bisphenol A (Araldite 6020) and 10 phr of the epoxy curative methylene-bis-orthochloroaniline. The fabrics were gently agitated in this emulsion for about a minute and then hung up at room temperature (about 27° C.) for about 16 hours, and then were heated 60 minutes at 165° C. in an air oven to at least partially cure the epoxy resin upon the fibers of the fabric.

The treated cotton and nylon fabrics were then each divided into four pieces, the first of which was reserved for testing without further treatment, while the other three were variously after-treated. The second piece of each was after-treated by dipping it into a 0.5% aqueous solution of m-aminophenol, after which it was dried 16 hours at about 27° C. and then was heated about 30 minutes at 165° C. in an air oven.

The third piece of cotton and nylon fabric was after-treated in a RF dip of 1% resin solids which was aged about 2½ hours before use. The fourth piece was after-treated by dipping in a mixture of equal parts by weight of a portion of the same RF dip (aged about 2½ hours) and of a 1% solution of m-aminophenol and dried 16 hours at 165° C.

The resorcinol-formaldehyde referred to as RF resin was made with a 1:2 molar proportion of resorcinol to formaldehyde, and sodium hydroxide was employed as a catalyst in the amount of 5% based on the dry solids weight of the RF resin, and the resin was diluted with water to 1% by weight concentration.

The four pieces each of variously treated cotton and nylon fabric were then laminated to a polychloroprene compound A of Table IV and test specimens were cut from the laminates after they were cured. The improved adhesion provided by these after-treatments is shown in the peel strength data of Table V.

The peel strength data in Table V teaches that cotton fabric and nylon fabric polychloroprene laminates show beneficial increase in peel strength in the same manner as polyester fabric when either the fabric with epoxy resin coating alone or the fabric with epoxy resin coating plus resorcinol-formaldehyde coating overlay is after-treated with aqueous m-aminophenol.

TABLE V

ADHESION OF COTTON AND NYLON FABRICS TO POLYCHLOROPRENE
Improvement of Adhesion by After-Treatment of Fabrics with m-Aminophenol

| Example No. | Fabric | Fabric Treatment A | | | Fabric Treatment B | Dry (16 hrs./ 27° C.) | Bonded to Polychloroprene and Tested* Peel Strength, lb./1" width |
|---|---|---|---|---|---|---|---|
| | | Epoxy Resin Emulsion[2] | dry (16 hrs./ 27° C.) | Cure (60 min./ 165° C.) | | | |
| | | (X) | (X) | (X) | | (X) | |
| 28 | Cotton | X | X | X | — | — | 17 |
| 29 | Cotton | X | X | X | 1% aqueous m-aminophenol solution | X | 20 |
| 30 | Cotton | X | X | X | 1% RF dip[1] | X | 25 |
| 31 | Cotton | X | X | X | A mixture of equal proportions of 1% RF dip (1) and 1% m-aminophenol aqueous solution | X | 26 |
| 32 | Nylon** | X | X | X | — | — | 16 |
| 33 | Nylon | X | X | X | 1% aqueous m-aminophenol solution | X | 26 |
| 34 | Nylon | X | X | X | 1% RF dip[1] | X | 40 |
| 35 | Nylon | X | X | X | A mixture of equal proportions of 1% RF dip (1) and 1% m-aminophenol | X | 41 |

TABLE V-continued

ADHESION OF COTTON AND NYLON FABRICS TO POLYCHLOROPRENE
Improvement of Adhesion by After-Treatment of Fabrics with m-Aminophenol

| Example No. | Fabric | Fabric Treatment A | | | Fabric Treatment B | Dry (16 hrs./ 27° C.) | Bonded to Polychloroprene and Tested* Peel Strength, lb./1" width |
|---|---|---|---|---|---|---|---|
| | | Epoxy Resin Emulsion[2] | dry (16 hrs./ 27° C.) | Cure (60 min./ 165° C.) | | | |
| | | | | | aqueous solution | | |

*Compounding recipe A, Table IV.
**Nylon 66
[1]a 1% by weight aqueous dispersion of resorcinol-formaldehyde resin in which the molar proportions of resorcinol and formaldehyde were in the ratio of 1:2, and sodium hydroxide was used as a catalyst in the amount of 5% on the weight of the resin. The dispersion was aged for at least 2 hours before application on the fabric or before mixing with the aqueous m-aminophenol and then applying to the fabric.
[2]Recipe I, Table I-A.
NOTE: Like advantages are attained with fabrics of mixed cotton and nylon fibers.

Examples 36 through 41 (Table VI)

Examples 36 through 41 Table VI are concerned with the adhesion of glass fiber fabric to a polychloroprene. Glass fiber fabric was first coated with an epoxy resin which was cured and then after-treated with m-aminophenol (both alone and in combination with resorcinol-formaldehyde dip) and the adhesion to polychloroprene determined.

The glass fiber fabric was first cleaned thoroughly in a sodium dichromate acid cleaning bath (see footnote to Table VI) followed by rinsing in plain water and dried. The fabric was then treated in a chloroform solution containing 1% diglycidyl ether of bisphenol A resin and 10 phr of the epoxy resin curative methylene-bis-orthochloroaniline. The fabric was agitated gently in this solution for about a minute, then dried four hours at 27° C., and finally heated 60 minutes at 163° C. to at least partially cure the epoxy resin on the glass fibers.

A portion of this treated fabric was then after-treated by dipping in a 0.5% by weight aqueous solution of m-aminophenol after which it was dried 16 hours at 27° C. followed by heating 30 minutes at 163° C.

Two portions each were then cut from both the pieces of glass fiber fabric that had been coated only with the epoxy coating and that which had been also after-treated with m-aminophenol. One portion of each of these fabrics was treated in a 1% alkaline RF dip (as in Examples 21 through 28) while the other was treated in a dip containing equal parts by weight of the 1% RF dispersion and a 1% solution of m-aminophenol (as in the examples of Table V). These fabrics were dried 16 hours at 27° C. and then heated 10 minutes at 115° C. before test specimens were made by lamination with a polychloroprene compound of Table IV, curing and testing for peel strength of the laminate as described for Examples 1 through 8 above in the section on "Preparation and Testing of Specimens." Table VI presents the peel test data obtained in this experiment which again teaches the beneficial effect of after-treatment of the coated glass fabric with m-aminophenol to improve the peel strength of the glass fabric-elastomer laminates.

TABLE VI

ADHESION OF GLASS FABRIC TO POLYCHLOROPRENE
Effects of m-Aminophenol After-treatment of Epoxy Resin Coated and Resorcinol-formaldehyde Resin Coated Glass Fiber Fabric

| Example No. | Glass Fiber Fabric* Treatment A | | | Coated Fabric Treatment B | | | Coated Fabric Treatment C | | | Bonded to Polychloroprene and Tested[2] Peel Strength (lbs./1" width) |
|---|---|---|---|---|---|---|---|---|---|---|
| | (1% epoxy resin** in chloroform with 10 phr MOCA[1]) | Dry (4 hrs./ 27° C.) | cure (60 min./ 163° C.) | m-aminophenol (0.5 wt. aqueous) | Dry (16 hrs./ 27° C.) | Heat 30 min./ 163° C. | RF Dip | Dry (16 hrs./ 27° C.) | Heat (10 min./ 115° C.) | |
| | (X) | (X) | (X) | (X) | (X) | (X) | | (X) | (X) | |
| 36 | X | X | X | — | — | — | — | — | — | 17 |
| 37 | X | X | X | X | X | X | — | — | — | 26 |
| 38 | X | X | X | — | — | — | 1% RF dip[2] | X | X | 21 |
| 39 | X | X | X | — | — | — | A mixture of equal proportion of 1%RF dip and 1% m-aminophenol aq. solution[2] | X | X | 24 |
| 40 | X | X | X | X | X | X | 1%RF dip[2] | X | X | 24 |
| 41 | X | X | X | X | X | X | A mixture of equal proportions of 1% RF dip and 1% m-aminophenol aq. solution[2] | X | X | 26 |

*Glass fiber fabric cleaned with cleaning mixture for chemical glassware consisting of 800 cc concentrated sulfuric acid 92 g. sodium dichromate and 458 cc of water.
**Araldite 6020, a trademark product of Ciba Products Co., see footnote (1), Table III-A
[1]A trademark designation of E. I. du Pont de Nemours & Co., Inc. for methylene-bis-orthochloroaniline.
[2]For compounding recipe see (9), Table III-A and compound was cured 60 min./165° C.
[3]Compounding recipe A, Table IV.

Examples 42 and 43 (Table VII)

Examples 42 and 43 are derived from an experiment in which six different afterdips containing m-aminophenol aqueous solution, resorcinol-formaldehyde resin dispersions, and various combination of these dips were applied to six portions each of two polyester fabrics that had been first treated with epoxy resin emulsions.

In Example 42 a piece of the polyester fabric Dacron was first dipped into an emulsion containing 1% DGEBA* resin solids prepared according to recipe I, Table I-A and described under Examples 1 thru 8 above in the section on "Preparation of Epoxy Emulsions." The fabric was then dried 16 hours at 27° C. followed by curing 30 minutes at 165° C.

In Example 43, a portion of polyester fabric was treated in an epoxy emulsion identical with that of Example 42 except that in addition to its 1% epoxy resin solids it also contained 10 phr of the epoxy resin curative methylene-bis-orthochloroaniline. After the fabric was dipped into the epoxy emulsion with gentle agitation for about a minute it was dried 16 hours followed by curing 30 minutes in an air oven at 165° C. and then was divided into six portions and dipped as described hereafter.

The six dips used in after-treating the six portions each of the two fabrics of Examples 42 and 43 were as follows:

1. An alkaline RF dip containing 1% RF resin solids and in which the molar ratio of resorcinol to formaldehyde was 1 to 1.5. Sodium hydroxide was employed as catalyst in the amount of 5.5 parts per hundred resin solids. The dispersion was made as a 2% stock aqueous solution and aged 2 hours

* Diglycidyl ether of bisphenol A. before it was diluted to 1% and then was aged 1 more hour before use. 2. A resin dispersion prepared like dip No. (1) except that half of the resorcinol was replaced with m-aminophenol. This resulted in an opaque dispersion of partially particulate resin. 3. A resin dispersion prepared like dip No. (1) above except that all of the resorcinol was replaced with m-aminophenol. The dispersion was opaque yellow and was aged 2½ hours before use, at which time an examination of a portion of the dispersion under a microscope showed that the resin was present as spherical particles which were less than a micron in diameter and exhibited Brownian movement.

4. A resin dip prepared from half of the 2% stock dispersion of RF resin of dip No. (1) (aged 2 hours) by adding to an equal weight of m-aminophenol solution in which the weight of m-aminophenol equalled the weight of resorcinol.

5. A resin dip prepared from half of the 2% stock dispersion of dip No. (2) (aged 2 hours) by adding to it an equal weight of aqueous solution of m-aminophenol in which the weight of m-aminophenol equalled the combined weights of resorcinol and m-aminophenol in the resin of dip No. (2). 6. A resin dip prepared from half of the 2% stock dispersion of dip No. (3) (aged 2 hours) by adding to it an equal weight of aqueous m-aminophenol solution in which the weight of m-aminophenol was equal to the weight of the m-aminophenol in the m-aminophenol-formaldehyde resin of dip No. (3).

The twelve pieces of polyester fabric treated by dipping in the six dispersions described above were dried about 16 hours at 27° C. Adhesion test specimens were then prepared by laminating the fabrics to a polychloroprene compound A, Table IV, by curing the laminates 60 minutes at 165° C. and then cutting test specimens from it as described for Examples 1 through 8 in the section above on "Preparation and Testing of Specimens." Peel test data obtained in these tests is presented in Table VII.

From the data in Table VII the following conclusions can be drawn:

1. If the fabric is only coated with an epoxy resin then after-treatment with m-aminophenol will greatly enhance the bonding to elastomers;
2. If the fabric is treated with
   a. an epoxy resin and with
   b. a phenoplast of the type of resorcinol-formaldehyde, resorcinol-m-aminophenol-formaldehyde or m-aminophenol-formaldehyde then the adhesion to elastomers is greatly enchance by treating with m-aminophenol either between the epoxy coating and the phenoplast coating or after the phenoplast coating.

TABLE VII

ADHESION OF POLYCHLOROPRENE COMPOUND* TO VARIOUSLY TREATED POLYESTER FABRICS
(Peel Strength in lbs./1" Width Given in Columns (1) thru (7))

| Example No. | 1st Fabric Treatment (Dacron Fabric Treatment) | Various 2nd Fabrics Treatments*** | | | | | |
|---|---|---|---|---|---|---|---|
| | | RF (1) | R-m-AP-F (2) | m-AP-F (3) | (1) + m-AP (4) | (2) + m-AP (5) | (3) + m-AP (6) |
| 42 | 1% epoxy emulsion dip and cured 30 min./165° C. + 30 min./165° C. | 23 | 18 | 26 | 27 | 33 | 30 |
| 43 | 1% epoxy emulsion dip plus 10 phr MOCA** and cured 30 min./165° C. | 23 | 16 | 30 | 35 | 35 | 36 |

*After the Dacron fabric was dipped it was then atmospherically dried and laminated to polychloroprene compounded according to recipe (A), Table IV and the compound was cured 60 min. at 165° C.
**A trademark designation of E. I. du Pont de Nemours and Co. Inc. for methylene-bis-orthochloro-aniline.
***RF = resorcinol-formaldehyde, R = resorcinol, F = formaldehyde, m-AP = m-aminophenol.
(1) 1% solids dispersion. Molar ratio of resorcinol to formaldehyde was 1:1.5. Sodium hydroxide was catalyst in the amount of 5.5 phr. Dispersion was made as a 2% stock solution, then was aged 2 hours, diluted to 1% and aged 1 more hour before use.
(2) Like (1) above except half of the resorcinol was replaced with m-aminophenol.
(3) Like (1) above except that m-aminophenol completely replaced the resorcinol of (1). Dispersion was opaque yellow. Particles were < 1 μ in size.
(4) Prepared from half of the 2% solution of (1) aged 2 hours by adding to it an equal weight of aqueous solution of m-AP in which the weight of m-AP equalled the weight of resorcinol in the resin of (1).
(5) Prepared from half of the 2% stock solution of (2) aged 2 hours by adding to it an equal weight of aqueous solution of m-AP in which the weight of m-AP equalled that of the resorcinol and m-AP of the resin of (2).
(6) Prepared from half of the 2% stock solution of (3) aged 2 hours by adding to it an equal weight of aqueous solution of m-AP in which the weight of m-AP equalled that of the m-AP in the resin of (3).

The m-aminophenol to form a dip thereof may be added to the aqueous RF resin or RFL resin before drying thereof, and preferably the aqueous RF or RFL resin is essentially free of formaldehyde to avoid having such formaldehyde react with the m-aminophenol and convert it to resin, which conversion could render the m-aminophenol ineffective for the purposes of this invention.

Examples 44 and 45 (Table VIII)

Examples 44 and 45 are concerned with the adhesion of an SBR compound to a fabric woven from modified polyester fibers produced by the Celanese Corporation, and show the improved adhesion resulting from the addition of m-aminophenol to RFL dips used in treating this fabric.

The fabric was an "adhesive activated" 12.8 oz. woven fabric containing Celanese type 790 yarn in the warp, and 797 (low shrinkage equivalent) yarn in the filling.

In example 44, Table VIII an RFL dip was made as follows: 33.2 parts by weight resorcinol was dissolved in a solution of 2.6 parts sodium hydroxide in 665 parts water and then 34.4 parts 37.5% formalin was added to provide a proportion of 1.4 formaldehyde to 1 resorcinol. This dispersion was aged 1½ hours and then combined with a mixture of 390 parts by weight of a butadiene-styrene-vinylpyridine-latex (Gen-Tac latex, a trademark product of the General Tire and Rubber Co.) of 41% solids and 30 parts of an SBR latex (Pliolite 3757E latex, a trademark product of the Goodyear tire and Rubber Co.) of 66% solids plus 70 parts water. This RFL dip was aged 24 hours before use.

The RFL dip used in Example 44B was made from a portion of that dip from Example 44A by adding to it m-aminophenol in an amount equal to the weight of resorcinol in the RFL dip and dissolved in water equal to ½ the weight of RFL dip. The m-minophenol can advantageously be combined with the elastomer latex especially with the butadiene-styrene-vinylpyridine latex (Gen-Tac latex).

The RFL dip of Example 45A was prepared as follows: 11 parts resorcinol were added to a solution of 1.5 parts sodium hydroxide in 239 parts water, and then 16.2 parts 37.5% formalin were added to provide a proportion of 2 moles formaldehyde to 1 mole resorcinol. This dispersion was aged 2½ hours at about 27° C. and then added to a mixture of 86 parts polychloroprene latex (Neoprene 635 latex, a trademark product of E. I. du Pont de Nemours and Co. Inc.) of 58% solids. This RFL dip was aged 1 hour before use.

The RFL dip of Example 45B was prepared from a portion of that 45A by adding to it m-aminophenol equal in weight to the resorcinol of the RFL dip and dissolved in water equal in weight to ½ that of the RFL dip.

Portions of that modified polyester fabric were dipped in each of the four RFL dips described above and then dried at least 16 hours at 27° C. Test specimens were then prepared by laminating them to an SBR compound (See Table VIII by the method described under Examples 1 through 8 above in the section on "Preparation and Testing of Specimens." Peel strength test data obtained for these four treated fabrics is presented in Table VIII.

The data in Table VIII shows that when adhering polyester fabric to butadiene-styrene-vinylpyridine elastomers employing a resorcinol-formaldehyde-latex dip the addition of m-aminophenol to the dip improved the adhesion of the laminate.

TABLE VIII

Effect of m-Aminophenol with RFL Dips on Adhesion of Modified Polyester Fibers* to SBR Compound

| Example No. | RFL Dip Peel Strength, lb./1" width | Adhesion to SBR Compound[3] |
|---|---|---|
| 44A | RFL dip[1] contained 13% by weight butadiene-vinylpyridine-styrene latex solids, 1.6% SBR latex solids, and 3.6% RF solids | 20 |
| 44B | As in 44A except for addition of m-aminophenol in amount equal in weight to the RF resin solids in the RFL dip. | 27 |
| 45A | RFL dip[2] contained 8.5% by weight polychloroprene latex solids 4.2% butadiene-vinylpyridine-styrene latex solids, 4.2% SBR Latex solids and 2.9% RF solids | 12 |
| 45B | As in 45A except for the addition of m-aminophenol equal in weight to that of RF resin in the RFL dip | 25 |

*An adhesive-activated polyester 12.8 oz. woven fabric containing Celanese type 790 yarn in the warp and type 797 (low shrinkage equivalent yarn) in the filling.
[1]The RFL dip was prepared by first reacting 33.2 parts by weight resorcinol and 34.4 parts of 37% formalin in a solution of 2.6 parts sodium hydroxide in 665 parts water. This RF dip was aged 1½ hours and then added to a mixture of 390 parts of Gen-Tac Latex (butadiene-styrene-vinylpyridine terpolymer). 30 pt Pliolite Latex 3757E, 66% solids and 70 pts. water. This RFL dip was aged 24 hours before use.
[2]The RFL dip was prepared by first reacting 11 parts by weight resorcinol and 16.2 parts 37% formaldehyde in a solution of 1.5 parts sodium hydroxide in 239 parts water. This RF dip was aged 2½ hours at about 27° C. and then added to a mixture of 86 parts of Neoprene 635 latex (a polychloroprene latex of 58% solids, E. I. du Pont de Nemours and Co. Inc. 38 parts Pliolite 37457E (a 66% solids SBR latex, Goodyear Tire & Rubber Co.) and 61 parts Gen-Tac latex (a butadiene-styrene-vinylpyridine terpolymer latex of about 41% solids, General Tire and Rubber Co.) and 141 parts water. This dip was aged 1 hour before use.
[3]100 SBR 1502, 50 HAF black, 3 zinc oxide, 1 stearic acid, 1 Santocure NS (n-tert-butyl-2 benzothiozole sulfonamide, Monsanto Co.) 1.75 sulfur, 1 Wingstay 100 (mixed diaryl paraphenylenediamines) Goodyear Tire and Rubber Co. Fabric-elastomer laminate cured 45 min./165° C.

Examples 46 and 47 (Table IX)

Examples 46 and 47 are concerned with the adhesion to a polychloroprene compound of the polyester Dacron and nylon 66 fabrics both of which were treated with aqueous dips containing equal parts by weight of an emulsified epoxy resin and an acidic RF resin in aqueous dispersion while portions of each were after-treated with m-aminophenol in aqueous solution.

The acidic RF resin dispersion was prepared as follows: 6.4 parts by weight resorcinol was dissolved in a solution of 1 part alkylarylpolyether alcohol (Triton X-155, a trademark product of Rohm and Haas Co.) and 30 parts of a 1% aqueous solution of hydrochloric acid were added followed by 9.4 parts 37.5% formalin. This mixture in a jar was rotated end-over-end for four hours, at the end of which time the RF resin was slightly milky in appearance. It was diluted to 1% resin solids with water and was then added to an equal weight of a 1% resin solids emulsion of a cycloaliphatic epoxy resin (Unox Epoxy 221, a trademark product of Union Carbide Co.).

In Examples 46A and 47A, pieces of polyester and nylon fabrics respectively were each treated by immersion and gentle agitation for about one minute in the epoxy-RF dip described above and then were dried 16 hours at 27° C. followed by curing 30 minutes at 165° C. In Examples 46B and 47B portions of these fabrics were then after-treated by dipping in 0.5% aqueous solutions of m-aminophenol after which they were dried 16 hours at 27° C. followed by curing 30 minutes at 165° C.

Adhesive test specimens were prepared from the above four fabrics by lamination with a polychloroprene compound A, Table IV, as described for Examples 1 through 8 in the section of "Preparation and Testing of Specimens." Peel strength test data for these treated fabrics is presented in Table IX. When the aqueous epoxy emulsion and the resorcinol-formaldehyde aqueous dispersion are combined in a single dip which is cured on the fibrous material to provide adhesion to rubber, then there is an advantage in treating the fabric first with the combination dip and drying the same and then with an aqueous m-aminophenol dip which in turn is dried in order to promote or improve the strength of the bond obtained.

solids (Araldite 6020) and 16 phr m-aminophenol. The fabric was dried 16 hours at 27° C, and then cured 60 minutes at 165° C. The fabric was then divided into two portions, one of which (Example 50A) was treated with the RFL dip described in footnote (1) Table VIII while the other (Example 50B) was treated with the same RFL dip plus m-aminophenol equal in weight to the resorcinol of the RFL dip.

In Example 51 the polyester fabric was treated with a 1% solution of a DGEBA resin in chloroform containing also 10 phr methylene-bis-orthochloroaniline, after which it was dried 2 hours at 27° C. followed by curing

TABLE IX

Effect of After-Treatment with m-Aminophenol on Adhesion to Polychloroprene of Fabrics Pre-Treated with a Mixture of Epoxy Emulsion and RF Resin After-Treatment with m-Aminophenol

| Example No. | Base Fabric | Fabric Treatment A | Cure | Fabric Treatment B | Cure | Bonded to Polychloroprene and Tested[3] Peel Strength (lbs./1" width) |
|---|---|---|---|---|---|---|
| 46A | Polyester[1] | Mixture of 1% by weight emulsion of cycloaliphatic epoxy resin* and equal weight of a 1% dispersion of RF resin** made with acid catalyst | 30 min./ 165° C. | None | — | 24 |
| 46B | Polyester[1] | " | " | 0.5% aq. solution of m-aminophenol | 30 min./ 165° C. | 26 |
| 47A | Nylon[2] | " | " | None | — | 36 |
| 47B | Nylon[2] | " | " | 0.5% aq. solution of m-aminophenol | 30 min./ 165° C. | |

*Unox Epoxide 221 - a trademark product of Union Carbide Corp. employed in recipe I, Table I-A.
**Prepared by the reaction of 6.4 parts by wt. resorcinol and 9.5 parts 37.5% formalin in a solution of 30 parts 1% HCl, 1 part Triton X-155 (alkylarylpolyether alcohol, Rohm & Haas Co.) 30 parts isopropanol and 40 parts water. This mixture was reacted five hours at 27° C. in a ball mill, then was diluted with water to provide a 1% resin dispersion.
[1]Polyethylene terphthalate "dacron".
[2]Nylon 66.
[3]Compounding Recipe A, Table IV.

Examples 48 through 51 (Table X)

Examples 48 through 51 concern the adhesion of polyester fabric, Dacron, to an SBR compound and presents a comparison of the effect of after-treatments of the fabric with RFL dips both with and without the addition of m-aminophenol.

In Examples 48 and 49 the polyester fabric was first treated by dipping in a 0.5% chloroform solution of a DGEBA resin (Araldite 6020), then was dried 4 hours at 27° C. and cured 30 minutes at 165° C, after which it was treated in Example 49 with 0.5% aqueous m-aminophenol solution, was dried 16 hours at 27° C., and cured 30 minutes at 165° C. The fabrics were then cut into two portions, one of which was treated with RFL dip while the other was treated with a portion of the same RFL dip plus m-aminophenol equal in weight to the resorcinol of the dip. The recipe for the RFL dip of Example 44 is given in footnote (1) of Table VIII.

In Example 50 a piece of polyester fabric was first treated with an emulsion containing 1% epoxy resin 60 minutes at 165° C. The fabric was then divided into 2 pieces; fabric designated 51A was treated in the RFL dip described in footnote (1) of Table VIII while the other fabric, 51B, was treated in a portion of the same dip to which was added m-aminophenol equal in weight to the resorcinol of the RFL dip.

These fabrics, after treatment with RFL dips, were dried 16 hours at 27° C. and then test specimens were prepared from laminates of the fabrics with an SBR compound (see Table X), by the method described for Examples 1 to 8 above in the section on "Preparation and Testing of Specimens." Peel test data for these variously treated fabrics is presented in Table X.

The data in Table X shows the adhesion of Dacron to SBR, employing epoxy coatings at least in part cured to the Dacron with heat and with or without the aid of curative material and with a further coating of RFL dip dried thereon, and improved by applying m-aminophenol prior to the RFL dip or in admixture with the RFL dip and drying the same before assembly with the vulcanizable elastomer and vulcanization thereof.

TABLE X

Effect of m-Aminophenol in RFL After-Treatment of Polyester Fabric Treated with Epoxy Resins on Adhesion to SBR

| Example No. | Fabric[1] Treatment A | | | Fabric Treatment B | | | Fabric Treatment C | | Adhesion to SER Compound Peel Strength lb./1" width |
|---|---|---|---|---|---|---|---|---|---|
| | | Dry | Cure | | Dry | Cure | | Dry | |
| 48A | 0.5% chloroform solution of epoxy resin* | 4 hr./ 27° C. | 30 min./ 165° C. | | | | RFL dip** | 16 hr./ 27° C. | 11 |
| 48B | " | " | " | | | | RFL dip** + m-aminophenol[5] | " | 26 |
| 49A | 0.5% chloroform solu- | 4 hr./ | 30 min./ | 0.5% aqueous solution | 16 hrs./ | 30min./ | RFL dip** | " | 19 |

TABLE X-continued

Effect of m-Aminophenol in RFL After-Treatment of Polyester Fabric Treated with Epoxy Resins on Adhesion to SBR

| Example No. | Fabric[1] Treatment A | Dry | Cure | Fabric Treatment B | Dry | Cure | Fabric Treatment C | Dry | Adhesion to SER Compound Peel Strength lb./1" width |
|---|---|---|---|---|---|---|---|---|---|
| 49B | " | " | " | " | " | " | RFL dip** + m-amino-phenol[5] | " | 36 |
| 50A | Emulsion of 1% epoxy[3] solids and 16 phr m-aminophenol | 16 min./ 27° C | 60 min./ 165° C. | RFL dip** | 16 hr./ 27° C. | | | | 10 |
| 50B | " | " | " | RFL dip** + m-AP[5] | " | | | | 27 |
| 51A | 1% solution by wt. of epoxy resin containing 10 phr MOCA[4] | 2 hr./ 27° C. | 60 mn./ 165° C. | RFL dip** | 16 hr./ 27° C. | | | | 12 |
| 51B | " | " | " | RFL dip** + m-AP[5] | " | | | | 22 |

*Araldite 6020, see Footnote [1], Table III-A.
**See footnote [1], Table VIII.
[1]Polyethylene terephthalate, "Dacron," a trademark product of E. I. du Pont de Nemours & Co., Inc.
[2]See footnote (3), Table VIII.
[3]Recipe I, Table I-A, with epoxy resin diglycidyl ether of bisphenol A (Araldite 6020) and no water added in step D.
[4]A trademark designation for methylene-bis-orthochloroaniline (E. I. du Pont de Nemours & Co., Inc.)
[5]m-Aminophenol added to RFL dip** in an amount equal to resorcinol in dip.

Example 52 (Table XI)

Example 52 is concerned with the adhesion of the polyester fabric Dacron to a polychloroprene compound and demonstrates the effect of a m-aminophenol aqueous dip as an after-treatment applied to fabric previously treated with an aqueous dip containing epoxy resin, m-aminophenol, RF resin, and an elastomer latex and cured. The aqueous epoxy-RFL dip was prepared as follows:

Fist an RF resin dispersion was prepared by dissolving 3.2 parts by weight resorcinol in 25 parts 1% aqueous solution of sodium hydroxide and adding to this 4.7 parts 37.5% formalin. This was allowed to age for 2 hours at about 27° C. and then it was diluted with water to form a 1% dispersion.

To the RF resin dispersion was added 12.2 parts by weight of a butadiene-styrene-vinylpyridine terpolymer latex (Gen-Tac) diluted with water to contain 5 parts solids and also an emulsion containing 1% DGEBA resin solids (Araldite 6020) and m-aminophenol in the amount of 16 parts by weight per hundred parts epoxy resin.

Polyester fabric was treated in this dip by immersion and gentle agitation for about a minute, then was dried 16 hours at about 27° C. followed by heating 60 minutes at 165° C. A portion of this fabric (Example 52A) was then reserved for testing while the balance (Example 52B) was dipped into a 0.5% aqueous m-aminophenol solution and dried 16 hours at 27° C.

These two fabrics were each laminated to a polychloroprene compound A, Table IV, and test specimens cut from the cured laminates as described for Examples 1 through 8 above in the section of "Preparation and Testing of Specimens." The comparative peel strength test data for these two treated fabrics is reported in Table XI.

The data in Table XI shows that the bond between Dacron and Neoprene, adhered with the aid of an aqueous emulsion of epoxy resin and resorcinol-formaldehyde resin containing m-aminophenol of at least partially cured on the Dacron before assembly with the Neoprene and vulcanization thereof, is improved by an after-treatment with m-aminophenol dried thereon prior to the assembly with the Neoprene and vulcanization thereof.

TABLE XI

ADHESION OF POLYESTER FABRIC TO POLYCHLOROPRENE
Effect of After-Treatment with m-Aminophenol on Polyester Fabric Pre-Treated with
Combination of Epoxy Resin Emulsion, m-Aminophenol, and RFL Dip

| Example No. | Fabric* Treatment A | Dry | Heat | Fabric Treatment B | Dry | Bonded to Polychloroprene Compound** and Tested Peel Strength, lb./1" width |
|---|---|---|---|---|---|---|
| 52A | An aqueous emulsion of 0.79% total solids consisting of approximately 30% epoxy resin[1] solids, 30% RF resin[2] solids, 30% elastomer as latex solids[3], 4.8% m-aminophenol, and 6% emulsifier[4] | 16 hr./ 27° C. | 60 min./ 165° C. | — | — | 31 |
| 52B | Same as 54A above | " | " | 0.5% aqueous m-aminophenol | 16 hr./ 27° C. | 41 |

*"Dacron" polyethylene terephthalate - a trademark product of E. I. du Pont de Nemours and Co. Inc.
**Compound recipe A, Table IV and cured 60 minutes at 165° C.
[1]Araldite 6020, a trademark product of Ciba Products Co. See recipe I, Table I-A.
[2]See footnote 2, Table VI.
[3]Gen-Tac latex - a terpolymer of styrene, vinylpyridine and butadiene, a trademark product of General Tire & Rubber Co.
[4]Equal parts by weight of polyoxyethylene sorbitan monostearate ("Tween 60", Atlas Chemical Industries) and Duponol ME (a lauryl alcohol sulfate, E. I. du Pont de Nemours & Co. Inc.

Examples 53 and 54 (Table XII)

Examples 53 and 54 are concerned with the adhesion of nylon 66 fabric to polychloroprene and demonstrate the effect of m-aminophenol after-treatment on nylon treated with RF resin in the form of particles of greater than colloidal size.

In Example 53 an RF resin was prepared using an acid catalyst as follows: 6.4 parts by weight resorcinol was dissolved in 70 parts water and then 30 parts 1% aqueous hydrochloric acid was added followed by 9.4 parts 37.5% formalin. This solution as allowed to stand at about 27° C. for one hour and 40 minutes, by which time an off-white precipitate (slightly pink) had formed in the bottom of the beaker containing the solution. The dispersion including precipitate were put into a small blender and run at high speed for about five minutes to break up the soft RF precipitate. Examination A, Table IV, according to the procedure described for Examples 1 through 8 above in the section on "Method of Testing the Strength of Fabric-Elastomer Bonds." The results of the peel strength tests are presented in Table XII.

The results set forth in Table XII show that adhering nylon to Neoprene using a particulate RF dip is improved when the nylon is given an after dip with aqueous m-aminophenol. We have found that the particulate RF dip here referred to when used as adhesives provides fibrous material-elastomer laminates having reduced stiffness as compared with laminates employing conventional RF and RFL dips.

TABLE XII

NYLON-POLYCHLOROPRENE ADHESION
Effect of After-Treatment with m-Aminophenol on Nylon Treated with RF Particulate Dip

| Example No. | Fabric* Treatment A | Dry 16 hr./27°C. | Fabric Treatment B | dry 16 hr./27° C. | Bonded to Polychloroprene Compound** and Tested Peel Strength, lb./1″ width |
|---|---|---|---|---|---|
| 53A | 1% dispersion of RF particles made with acid catalyst[1] | X | — | — | 41 |
| 53B | 1% dispersion of RF particles made with acid catalyst[1] | X | 0.5% m-aminophenol aqueous solution | X | 43 |
| 54A | 1% dispersion of RF particles made with triethanolamine[2] | X | — | — | 40 |
| 54B | 1% dispersion of RF particles made with triethanolamine[2] | X | 0.5% m-aminophenol aqueous solution | X | 46 |

*Nylon 66
**Compound recipe A, Table IV cured 60 min. at 165° C.
[1]This RF dispersion was prepared by reaction of 6.4 parts by weight resorcinol with 9.4 parts 37.5% formalin in a mixture of 30 parts 1% HCl and 70 parts water. This mixture was allowed to stand for about 100 minutes until a white precipitate was observed. This was broken up by agitation in a blender at high speed, then the mixture was diluted to 1% solids and used. By examining a sample of the dispersion under a microscope it was observed that the RF resins were in the form of spherical particles and clusters of these particles. These particles ranged in diameter from about 3 to 11 microns.
[2]This RF dispersion was prepared by dissolving 6.4 parts by weight resorcinol in a solution of 1 part triethanolamine and 50 parts water, then adding 9.4 parts 37.5% formalin. After about 15 minutes the solution became cloudy and sightly pink. Thereupon it was diluted to provide a 1% dispersion, and was allowed to stand for about 3 hours before employing it as a fabric dip. By examination of a sample of this dispersion under a microscope, it was determined that the resin was present in the form of spherical globules mostly in the range of 2.0–2.5 microns in diameter.

of a sample of the dispersion under a microscope then showed the resin to be present in the form of irregular spherical particles ranging in size from 3 to 11 microns in diameter with the majority in the 4–8 micron size range, When dry the spheres were bright red. This RF dispersion was diluted with water so that the resin solids were reduced to 1% by weight. One piece of nylon fabric was dipped into the dispersion described above and then dried overnight at 27° C. (Example 53A). Then a portion of this fabric was cut off, dipped into a 0.5% aqueous solution of m-aminophenol, and dried 16 hours at 27° C. (Example 53B).

The RF resin of Examples 54A and 54B was prepared as follows: 6.4 parts by weight resorcinol was dissolved in a solution of 1 part triethanolamine and 100 parts water and then 9.4 parts formaldehyde were added, and the mixture was ball-milled in a glass container for 2½ hours. The dispersion was then opaque and a pale pink in color. When a sample of the dispersion was examined under a microscope it was seen that the resin was in the form of regular spherical globules in the range of 1.5 to 3.5 microns in diameter and exhibiting Brownian movement. This dispersion was diluted with 883 parts water to reduce the RF solids to 1%.

A piece of nylon fabric was treated in the above dispersion by immersion and gentle agitation for about a minute. Then it was dried 16 hours at 27° C. (Example 54A). A portion of it was then cut off and after-treated with a 0.5% aqueous solution of m-aminophenol (Example 54B) and dried again 16 hours at 27° C.

The four pieces of treated nylon fabric were then tested in laminates with a polychloroprene compound

Examples 55 and 56 (Table XIII)

Examples 55 and 56 demonstrate the effects of the addition of varying amounts of m-aminophenol to elastomer latices used in RFL dips for the treatment of polyester fabric to improve its adhesion to elastomer compounds.

The particular polyester fabric used in these examples was woven from the "adhesive activated" types 790 and 797 polyester yarns produced by Celanese Corporation.

The latex to which the m-aminophenol was added was a mixture of a butadiene-vinylpyridine-styrene terpolymer latex (Gen-Tac latex, General Tire and Rubber Company) and an SBR latex (Pliolite 3757E, Goodyear Tire and Rubber Co.) in the ratio of 5 parts vinylpyridine-terpolymer latex solids to 1 part SBR latex solids. The m-aminophenol was added to the butadiene-vinylpyridine-styrene-latex.

This mixture of latices was divided into four portions of 150 g., each containing 60 g. solids. To the first (control) portion 100 g. pure water was added, while to the second portion 3 g. m-aminophenol dissolved in 97 g. water were added. Similarly to the third portion were added 6 g. m-aminophenol dissolved in 94 g. water, and to the fourth portion 12 g. m-aminophenol dissolved in 88 g. water. These latex mixtures were allowed to stand for 1½ hours before 150 g. of an alkaline RF dispersion containing 12 g. RF resin solids (of 1:2 resorcinol-formaldehyde molar ratio) were added to each. This RF resin dispersion had been aged 1½ hours before addition to the latex mixture. The RFL mixture thus obtained was aged for 1 hour before treatment of the polyester fabric by dipping pieces of it into each of the four RFL dips, respectively.

The four treated polyester fabrics were hung up to dry at room temperature overnight then were heated 10 minutes at 115° C, They were then formed into laminates with an SBR compound in a Carver press and then the laminates were cured 60 minutes at 165° C. and specimens were cut from the cured laminates and were tested for peel strength. The results of these tests are presented in Table XIII and show that for bonding a fabric material to an elastomer using an RFL dip, when m-aminophenol is added to the elastomer latex which is combined with an aqueous dispersion of a resorcinol-formaldehyde resin then better adhesion is obtained than when the elastomer latex of such RFL dip does not contain added m-aminophenol.

Similarly, in practicing Example 45B, the m-aminophenol may be added to one or more of the elastomer latices, e.g. the polychloroprene latex, the butadienes-tyrene latex, and the butadiene-styrene-vinylpyridine latex, and the thus improved latex composition can be used in forming the improved RFL dip. Preferably the m-aminophenol is combined with the vinylpyridine polymer latex, in the ratio of about 10 parts m-aminophenol per 15 parts latex, dry basis, and this combination used in the proportions set out in Example 45B provides the designated quantity of m-aminophenol based on the RF resin.

A 40% dispersion of the blocked diisocyanante was first prepared by ball-milling overnight a mixture of 10 parts of the bis phenol adduct of methylene-bis(4-phenyl isocyanate) (Hylene MP, E. I. du Pont de Nemours and Co. Inc.) and 1 part of sulfonated ester of a fatty acid (Aerosol OT, American Cyanamid Co.) dissolved in 14 parts water.

In the blender was combined 9 parts of the Hylene MP dispersion containing 3.6 parts of the dry blocked diisocyanate, 4 parts of a 1% aqueous solution of gum tragacanth and 1.36 parts of a water dispersible dry epoxy resin (Epon 812) and 86 parts water and agitated to form a dispersion.

"Dacron" polyester fabric was dipped into the above dispersion and dried 6 hours at about 27° C. followed by heating 5 minutes at 115° C. This treated fabric was then divided into two pieces, one of which (Example 57) was dipped into a 20% solids RFL dip while the other (Example 58) was dipped into a second portion of the same RFL dip to which had been added 5 parts by weight m-aminophenol per 8.5 parts RF resin.

The basic RFL dip of these examples was prepared as follows: 11 parts by weight resorcinol was combined with 320.5 parts water, 0.3 parts sodium hydroxide, and 16.2 parts 37% formalin and this mixture was allowed to age for six hours before combination with 250 parts 40% vinylpyridine terpolymer latex (Gen-Tac, General Tire and Rubber Co.) and 11.3 parts 28%

TABLE XIII

Effect of m-Aminophenol in Latex used in RFL Dips as Adhesive for Modified Polyester Fabric to SBR Elastomer Compound

| Example No. | Composition of RFL Dips Latex Mixture parts by weight | RF Resin(1) Parts by wt. | Dispersion solids pphr | Adhesion to an SBR *Compound of Modified Polyester Fabric Treated with RFL Dips (laminates cured 60 min./165° C.) Peel Strength, lb./1″ width |
|---|---|---|---|---|
| 55A | 125 parts vinylpyridine terpolymer latex(2) (50 solids) 26 parts SBR latex (10 solids 100 parts water | 150 (12 solids) | 20 | 29 |
| 55B | 125 parts vinylpyridine terpolymer latex(3) (50 solids) 25 parts SBR latex(3)(10 solids) 3 parts m-aminophenol (5 phr) 97 parts water | 150 (12 solids) | 20 | 37 |
| 56A | 125 parts vinylpyridine terpolymer latex(2) (50 solids) 25 parts SBR latex(3) (10 solids) 6 parts m-aminophenol (10 phr) 94 parts water | 150 (12 solids) | 20 | 38 |
| 56B | 125 parts vinylpyridine terpolymer latex(2) (50 solids) 25 parts SBR latex(3) (10 solids) 12 parts m-aminophenol (20 phr) 88 parts water | 150 (12 solids) | 20 | 39 |

*100 SBR 1502, 50 HAF black (Philblack O, Phillips Petroleum Co.,), 1,2,2'-methylene bis(4-methyl-6-tertiary-butylphenol) (Antioxidant 2246, American Cyanamid Co.), 3 zinc oxide, 2 sulfur, 1.25 N-oxydiethylene benzothiazole-2-sulfonamide (Nobs Special, American Cyanamid Co.).
**Celanese type 790 "adhesive activated" polyester was used as warp in this fabric while type 797 (low shrinkage equivalent) was used in filling.
(1)The RF resin was prepared in one master solution for all seven dips as follows: 53.8 g. resorcinol was dissolved in 420 g. 1% NaOH, then 79 g. of 37.5% formalin and 497 g. water were added, after which the dispersion was aged for 1½ hours before addition to the latex mixture. The RFL mixture was aged 1 hour before use.
(2)Gen-Tac latex, General Tire and Rubber Co.
(3)Pliolite 3757E, Goodyear Tire and Rubber Co. (Reduced to 40% solids).

Examples 57 and 58 (Table XIV)

Examples 57 and 58 demonstrate the improved adhesion between polyester and an SBR compound obtained by adding m-aminophenol to the second dip of a 2-dip commercial type fabric treatment in which the first dip was a dispersion containing a blocked diisocyanate and an epoxy resin, while the second was an RFL dip containing vinylpyridine terpolymer latex.

ammonium hydroxide. This dip was divided in half and to one half 5 parts m-aminophenol dissolved in 100 parts water were added.

Pieces of polyester fabric, pre-treated as described above were dipped into each of the above RFL dips, dried 17 hours at about 27° C. and then heated 30 minutes at 165° C. before being formed into test laminates with an SBR compound.

Table XIV presents test data for the cured laminates showing that m-aminophenol added to the RFL dip contributed a significant increase in peel strength.

TABLE XIV

ADHESION OF POLYESTER FABRIC[1] TO SBR
Improvement of Adhesive Strength by Addition of m-Aminophenol to Second Dip
of a Two-Dip Commercial Adhesive Fabric Treatment

| Example No. | Fabric Dip I | Dry | Fabric Dip II | Dry | Heat | Adhesion to SBR[3] Compound (laminates cured 60 min./165° C.) Peel Strength, lb./1" width |
|---|---|---|---|---|---|---|
| 57 | 5% solids dispersion of 3.6 parts blocked diisocyanate* and 1.36 parts epoxy resin** | 6 hr./ 27° c. 5 min./115° C. | 20% solids RFL dip (2) | 17 hr./ 27° C. | 30 min./ 165° C. | 23 |
| 58 | 5% solids dispersion of 3.6 parts blocked diisocyanate* and 1.36 parts epoxy resin** | 6 hr./ 27° C. 5 min./ 115° C. | 20% solids RFL dip[2] + 5 parts m-aminophenol per 8.5 parts RF resin | 17 hr. 27° C. | 30 min./ 165° C. | 35 |

*Bis phenol adduct of methylene bis-(4-phenyl isocyanate) Hylene MP, E. I. du Pont de Nemours and Co. Inc.
**Epon 812, Shell Chemical Co.
[1]Dacron, E. I. du Pont de Nemours & Co., Inc.
[2]Prepared so as to contain 100 parts vinylpyridine terpolymer latex solids (Gen-Tac, General Tire and Rubber Co.), 17.3 parts RF resin (made with 0.3 parts sodium hydroxide catalyst and aged 6 hours) and 11.3 parts 28% ammonium hydroxide.
[3]100 SBR 1502 1,2,2'2,2'-methylene-bis(4-methyl-6-tertiary-butyl-phenol) (antioxidant 2246, American Cyanamid Co.) 50 HAF black (Philblack O, Phillips Petroleum Co.) 3 zinc oxide, 2 sulfur 1.25 N-oxydiethylene benzothiazole-2-sulfonamide (Nobs Special, American Cyanamid Co.)

Examples 59 and 60 (Table XV)

Examples 59 and 60 demonstrate the effect on adhesion of adding m-aminophenol to RFL dispersions in which the RF resin was made in the presence of the latex (Gen-Tac, a vinylpyridine terpolymer latex produced by General Tire and Rubber Co.). This RFL dip was prepared as follows: 11 parts resorcinol was dissolved in a solution of 0.3 parts sodium hydroxide in 130 parts water and added to 250 parts Gen-Tac latex containing about 100 parts polymer solids then was added 16.3 parts 37% formalin in 191 parts water and the mixture was aged at 27° C. for 2½ hours. Then 11.3 parts 28% ammonium hydroxide was added and the dispersion was allowed to stand for another half hour before use.

The RFL dispersion was then divided into two equal portions each containing 8.5 parts RF resin. To one portion (Example 59) was added 100 parts by weight water and to the second portion of the dispersion (Example 60) was added a solution of 5 parts m-aminophenol in 95 parts water.

Pieces of modified polyester fabric (woven of Celanese Corporation's types 790 and 797 yarns) were immersed in the above RFL dips and then dried at about 27° C. for 16 hours followed by heating 10 minutes at 115° C.

The 2 pieces of RFL treated polyester fabric were then each formed into test laminates with sheets of an SBR compound [1] and the laminates pre-heated 20 minutes at 115° C. then cured 60 minutes at 165° C. Table XV presents test data showing that the addition of m-aminophenol resulted in a considerable improvement in adhesion.

TABLE XV

RFL DIPS IN WHICH RF RESIN WAS FORMED IN PRESENCE OF LATEX
Effect of Addition of m-Aminophenol on Adhesion of Modified Polyester Fabric to SBR Compound**

| Example No. | RFL Dip | Drying of Fabric | Adhesion to SBR Compound Laminates cured 60 min./165 Peel Strength, lb./in. width |
|---|---|---|---|
| 59 | 17 parts RF resin formed in presence of 100 parts vinyl-pyridine terpolymer latex[1] [2] (dry basis) | 16 hr. at 27° C. + 10 min. at 115° C. | 32 |
| 60 | As in Example 59 except for the addition of 5 parts m-aminophenol per 8.5 parts RF resin [2] | 16 hr. at 27° C. + 10 min. at 115° C. | 42 |

*An adhesive-activated polyester 12.8 oz. woven fabric containing Celanese type 790 yarn in the warp end type 797 (low shrinkage equivalent yarn) in the filling.
**See Table XIV for compounding recipe.
[1]The latex used was Gen-Tac, General Tire and Rubber Co.
[2]The RFL dip was prepared as follows: 11 parts resorcinol was dissolved in a solution of 0.3 parts sodium hydroxide in 130 parts water and added to 250 parts Gen-Tac latex containing 100 parts polymer solids, 16,3 parts 37% formalin in 191 parts water was then added and this mixture was aged 2½ hours at 27° C. after which 11.3 parts of 28% ammonium hydroxide was added and the dispersion was aged for another half hour. It was then divided into 2 equal portions to the first of which (Example 59) 100 parts plain water were added, while to the second (Example 60) were added 5 parts m-aminophenol dissolved in 95 parts water.

Example 61 and 62

Examples 61 and 62 are concerned with the adhesion of nylon fabric to a fluoroelastomer compound and demonstrate improvement of adhesion resulting from the addition of m-aminophenol to RF fabric dips.

An RF resin dispersion was first prepared by combining 6.4 parts resorcinol, 100 parts water, 0.5 parts sodium hydroxide and 9.5 parts 37% formalin. This was aged for 2½ hours at about 27° C. then diluted with water to provide a 2% dispersion of RF resin solids. In Example 61, 100 parts of this 2% dispersion were diluted with an equal weight of water and a piece of nylon 66 fabric was dipped into the resultant 1% dispersion and then dried at about 27° C. for 16 hours. In Example 62, to 100 parts of the 2% dispersion was added an equal weight of a 2% aqueous solution of m-aminophenol. A piece of nylon fabric was similarly dipped into this mixture and dried.

Laminates were prepared from these two pieces of treated nylon and a compound of an elastomeric copolymer of vinylidene fluoride and perfluoropyropylene (Viton B, E. I. du Pont de Nemours and Co. Inc.). Table XVI presents the peel test data obtained from test specimens cut from the cured laminates.

TABLE XVI

ADHESION OF NYLON FABRIC TO A FLUOROELASTOMER COMPOUND*
Improvement of Adhesion by Addition of m-Aminophenol to RF Fabric Dip

| Example No. | RF Fabric Dip | Drying of Fabric hrs./°C. | Cure of Nylon-Fluoroelastomer Laminate min./°C** | Peel Strength of Laminate lb./1" width |
|---|---|---|---|---|
| 61 | 1% RF solids aqueous dispersion[1] | 16/27 | 120/165 | 32 |
| 62 | 1% RF solids aqueous dispersion[1] containing m-aminophenol in an amount by weight equal to that of the RF resin. | 16/27 | 120/165 | 39 |

*100 parts copolymer of vinylidene fluoride and perfluoropropylene (Viton B, E. I. du Pont de Nemours & Co., Inc.), 15 low-activity magnesium oxide (Maglite Y, Merck & Co. Inc), 20 medium thermal carbon black, (Thermax, R. T. Vanderbilt Co.), 1 hexamethylenediamine carbamate (Diak No. 1, E. I. du Pont de Nemours and Co. Inc.).
**After 60 minutes gradual rise in temperature from 27° to 165° C.
[1]The RF dips of Examples 61 and 62 were prepared as follows: 6.4 parts resorcinol, 100 parts water, 0.5 parts sodium hydroxide and 9.5 parts 37% formalin were combined and the combination aged for 2½ hours, after which it was diluted with water to provide a 2% RF solids dispersion. In Example 61, 100 parts of the 2% dispersion was diluted with an equal weight of water to provide a 1% RF dispersion. In Example 62, to 100 parts of the 2% dispersion was added an equal weight of a 2% aqueous solution of m-aminophenol

Examples 63-93

Examples 63-93 are directed to further embodiments of the invention wherein the applicant's discovery is applied to the improvement of adhesive bonds with combinations of substrate other than those set out in Examples 1-62, and with Examples 1-62 illustrate the general applicability of the invention to the improvement of phenoplast adhesives, for adhering wood, metal, plastics, glass, rubber, paper, etc., substrates to like or different substrates.

Examples 63-68

A mill-mixed polychloroprene masterbatch consisting of 100 parts Neoprene AC (E. I. du Pont de Nemours and Co. Inc.), 2 parts phenyl-alpha-naphthylamine, 4 parts magenesium oxide, and 5 parts zinc oxide was added to a solution of 45 parts heat reactive phenolic resin (Bakelite CKM-1634, Union Carbide Corporation) dissolved in 431 parts toluene. Four additional parts magnesium oxide were also added and the mixture was ballmilled for 24 hours, then one part water was added and the cement was ball-milled for another hour.

The cement was then divided into three separate portions each containing 33.3 parts rubber and 15 parts resins. To the first portion (Example 63) were added 32 parts methyl ethyl ketone (MEK). To the second portion (Example 64) was added a solution of 11 parts m-aminophenol dissolved in 44 parts MEK, while to the third (Example 65) was added 22.5 parts m-aminophenol dissolved in 90 parts MEK. After these additions, the cements were again ball-milled for an hour before use.

The three cements were each applied with a brush to ⅝ inch square areas near one end of flat soft-wood sticks. The first coat of cement was allowed to dry for about an hour, then second coats were applied and when they had become tacky pairs of sticks were assembled together, with cement-coated areas together and the uncoated ends of the sticks forming a 180° angle. The sticks were pressed together with finger pressure and then were placed under weights for about 17 hours with one 500 g. weight supported by 2 specimens lying side by side. The weights were then removed, and the specimens left to age at about 27° C.

Table XVIII presents data obtained in lap shear tensile tests of these specimens and demonstrates the improvement of adhesive strength obtained by the addition of m-aminophenol to the polychloroprene-phenolic cement.

TABLE XVII

Adhesion of Wood to Wood and of Aluminum to Wood
Improvement of Adhesion by Addition of m-Aminophenol to Polychloroprene Cements

| Example No. | Adhesive Formulation (parts by weight) | Aging of Laminates (days/27° C.) | Lap Shear Strength Wood-Wood (psi) | Lap Shear Strength Aluminum-Wood (psi) |
|---|---|---|---|---|
| 63 | Base formulation (100 Neoprene AC*, 2-phenol-alpha-napthylamine, 8 magnesium oxide, 5 zinc oxide, 45 Bakelite CKM-1634**, 431 toluene) plus 32 MEK | 5 | 262 | |
| 64 | base formulation (above) plus 11 m-aminophenol in 44 MEK | 5 | 298 | |
| 65 | Base formulation (above) plus 22.5 m-aminophenol in 90 MEK | 5 | 411 | |
| 66 | Base formulation (above) plus 32 MK | 12 | | 397 |
| 67 | Base formulation (above) plus 11 m-aminophenol in 44 MEK | 12 | | 423 |
| 68 | Base formulation (above) plus 22.5 m-aminophenol in 90 MEK | 12 | | >427[1] |

*E. I. du Pont de Nemours and Co. Inc.
**Union Carbide Corporation.
[1]Testing machine was stopped because stress exceeded its capacity.

Examples 69 and 70

Examples 69 and 70 are concerned with supported adhesive films prepared by dipping filter paper into RFL dips containing vinylpyridine terpolymer latex, and demonstrate the improved adhesion obtained by after-treating the dried films by dipping them into a dilute solution of m-aminophenol.

The RFL dip was prepared as follows: 12.8 parts resorcinol were dissolved in 100 parts aqueous 1% sodium hydroxide, and then 19 parts 37% formalin were added. This mixture was aged for 30 minutes and then 250 parts Gen-Tac latex (General Tire and Rubber Co.) were added to it and the combination was aged for two hours before use. Strips of filter paper were then dipped into the RFL dip and dried at about 27° C. After about 24 hours one of the strips was dipped into a 0.5% solution of m-aminophenol in MEK and re-dried.

After 3 days, circles 3/16 inch in diameter were cut from the two films and each circle was placed between the over-lapping ends of two flat sticks ¼ inch wide so that the circle was at about the midpoint of the one inch overlap. This assembly was wrapped in aluminum foil to hold its members temporarily in place and then was laminated in a small laboratory (Carver) press for one hour at a temperature of 160° C.

In Examples 69 and 70, the films were those without and with the m-aminophenol after-dip respectively. The results of lap shear tensile tests conducted as in Examples 63–68 and presented in Table XVIII showed that after-treatment with m-aminophenol resulted in improved adhesion.

added to 172 parts Neoprene 635 latex (E. I. du Pont de Nemours and Co. Inc.) containing 100 parts solids. After this mixture had aged for two hours, a strip of filter paper and a strip of nylon fabric were each dipped into it and dried at about 27° C. These furnished the tapes for Examples 71 and 73. Portions of the treated paper and fabric were then dipped into a 0.5% solution of m-aminophenol in MEK and re-dried. These furnished the tapes for Examples 72 and 74.

In Examples 71 and 72, ½ inch squares were cut from the papersupported adhesive tapes and placed between the overlapping ends of ½ × 3 × 3/64 inch aluminum strips. These assemblies were laminated in a press for 60 minutes at 165° C.

In Examples 73 and 74, circles 3/16 inch in diameter were cut from the nylon fabric-supported adhesive tapes and the circles were placed between the over-lapped ends of ¼ inch wide flat wood sticks, and these assemblies were also press-laminated 60 minutes at 165° C.

The four specimens described above were subjected to lap shear tensile tests as described for Examples 63 to 68. The results of these tests are presented in Table XIX and show that where the paper and nylon tapes were after-treated with m-aminophenol (Examples 72

TABLE XVIII

Adhesion of Wood to Wood with RFL Films on Paper Support
Improvement of Adhesion by After-Treatment of Film with m-Aminophenol

| Example | Preparation of Supported Adhesive Films | Area of Film | Cure of Laminate min./° C. | Lap Shear Tensile lb. | Lap Shear Tensile lb./sq.in. |
|---|---|---|---|---|---|
| 69 | Filter paper dipped into RFL dip* containing vinylpyridine terpolymer latex and 20 phr RF resin and dried at 27° C. | .0276 sq. in. (circle) | 60/160 | 80 | 2900 |
| 70 | As above plus after-treatment of the dried films in a dip of 0.5% m-aminophenol in MEK | .0276 sq. in. (circle) | 60/160 | >100** | >3600** |

*12.8 parts resorcinol were dissolved in 100 parts aqueous sodium hydroxide, and then 19 parts 37% formalin were added. This mixture was aged for 30 minutes and then 250 parts Gen-Tac latex (General Tire and Rubber Co.) containing 100 parts solids were added to it and the combination was aged 2 hours before use.
**Test was stopped short of failure of adhesive because stress exceeded capacity of the testing machine.

and 74) adhesion was improved in both instances.

TABLE XIX

RFL Adhesives on Paper and Nylon Fabric Supports
Improvement of Adhesion by After-Treatment with m-Aminophenol

| Example | Preparation of Supported Adhesive | Area of Adhesion | Adherends | Cure of Laminate min./° C. | Lap Shear Tensile lb. | Lap Shear Tensile PSI |
|---|---|---|---|---|---|---|
| 71 | Filter paper was dipped into RFL dip* containing polychloroprene latex and 20 parts RF resin and dried at 27° C | 0.25 sq.in. (square) | Aluminum | 60/160 | 70 | 280 |
| 72 | As above plus after-dip of ½% m-aminophenol in MEK | 0.25 sq. in. (square) | Aluminum | 60/160 | 88 | 350 |
| 73 | Nylon 66 fabric was dipped into RFL dip* containing polychloroprene latex and 20 parts RF resin and dried at 27°. | .0276 sq. in. (circle) | Wood | 60/160 | 54 | 1950 |
| 74 | As above plus after-dip of ½% m-aminophenol in MEK | .0276 sq. in. (circle) | Wood | 60/160 | 70 | 2500 |

*12.8 parts resorcinol were dissolved in 100 parts aqueous sodium hydroxide and then 19 parts 37% formalin were added. The solution was aged 30 minutes and then added to 172 parts Neoprene 635 latex (E. I. du Pont de Nemours & Co. Inc.) containing 100 parts solids. This mixture was aged for 2 hours before use.

Examples 71–74

In Examples 71 through 74 an RFL adhesive dip containing polychloroprene latex was absorbed on both paper and nylon fabric supports and dried, after which portions of the treated paper and fabric were further treated by being dipped into dilute solutions of m-aminophenol.

The basic RFL dip was prepared as follows: 12.8 parts resorcinol were dissolved in 100 parts aqueous sodium hydroxide and then 19 parts 37% formalin were added. The solution was aged 30 minutes and then

Examples 75–78

Examples 75–78 demonstrate improvement of wood-to-wood adhesion resulting from the addition of m-aminophenol to a polychloroprene-phenolic cement used in preparing adhesive films supported on nylon film and aluminum foil.

A mill-mixed polychloroprene masterbatch containing 100 parts Neoprene AC (E. I. du Pont de Nemours & Co. Inc.) 2 parts phenylalpha-naphthylamine, 4 parts magnesium oxide, and 5 parts zinc oxide was dissolved in 360 parts toluene. To this was added a combination of 50 parts modified Novolac resin (Durez 12686, Hooker Chemical Corportion) dissolved in an equal weight of acetone and 4.1 parts hexamethylenetetramine dissolved in 47 parts chloroform. The cement was then divided into two equal portions, to the first of which (Examples 75 and 77) was added 50 parts acetone while to the second (Examples 76 and 78) m-aminophenol in 37.5 parts acetone.

The cement containing m-aminophenol and that without it were each applied with a brush to both nylon 6 film (Examples 75 and 76) and to aluminum foil of 1 mil thickness (Examples 77 and 78) and the coatings were allowed to dry thoroughly at about 27° C.

Circles of 1/16 inch diameter were then cut with a cork borer from the coated nylon films and aluminum foils, and were placed between the overlapping ends of soft-wood sticks so that the circles of adhesive tape were about in the center of a one inch overlap of the sticks. Aluminum foil was wrapped around these assemblies to hold their members temporarily in place and then they were laminated together in a small laboratory press (Fred S. Carver Inc.) for 60 minutes at 160° C. (examples 75 and 76) or 55 minutes at 180° C. (Examples 77 and 78) and a pressure of at least 40 psi, sufficient to insure good contact.

The cured adhesive specimens, after cooling, were tested for lap shear strength as previously described for Examples 63–68. The results, as presented in Table XX, showed that the specimens of Examples 76 and 78, laminated with supported phenolic-polychloroprene adhesive containing m-aminophenol were superior in lap shear strength to those of 75 and 77 in which m-aminophenol was not used.

elastomer (Examples 81 and 82) and show the increase of adhesive strength contributed by an after-treatment of these tapes with m-aminophenol applied from a dilute solution.

The adhesive tapes were prepared as follows: 19.4 parts Penocolite R-2170 (a 75% aqueous solution of resorcinol formaldehyde thermoplastic resin, Koppers Co. Inc.) were diluted with 120 parts 1% aqueous sodium hydroxide, and then 2.4 parts hexamethylenetetramine dissolved in 158 parts water were added. This solution was then divided into 2 equal portions, to one of which 125 parts (50 parts solids) Gen-Tac Latex (General Tire and Rubber Co.) were added, while to the other were added 117 parts (50 parts solids) Chemigum 245-CH5 (butadiene-acrylinitrile latex, Goodyear Tire And Rubber Co.).

Strips of filter paper were dipped into each of these resinlatex mixtures, and were thoroughly dried at about 27° C. Then portions of each were dipped into a 0.5% solution of m-aminophenol in acetone, after which they were again dried as before.

The tapes coated with adhesives containing vinylpyridine terpolymer and butadiene-acrylonitrile elastomer and not aftertreated were used in Examples 79 and 81 respectively, while portions of these tapes which were after-treated with m-aminophenol were used in Examples 80 and 82.

Circles of 1/16 inch diameter were cut from these tapes and placed between the over-lapping ends of flat wood sticks so that the circles of adhesive tape were approximately in the center of a one inch over-lap of the sticks. These assemblies were then wrapped in aluminum foil to hold their members temporarily in place and then were laminated in a small laboratory press for

TABLE XX

Phenol-Polychloroprene Adhesives on Nylon Film and Aluminum Foil Supports
Improvement of Wood to Wood Adhesion by Addition of m-Aminophenol to Adhesive

| Example No. | Preparation of Supported Adhesive | Area of Adhesion | Adherends | Cure of Laminate (min./° C.) | Lap Shear (lbs.) | Tensile (psi) |
|---|---|---|---|---|---|---|
| 75 | Nylon 6 film was painted on both sides with polychloroprene-phenolic cement* | .0276 sq. in. (circle) | Wood | 60/160 | 63 | 2280 |
| 76 | Nylon 6 film was painted with polychloroprene phenolic cement as above except for addition of 25 parts m-aminophenol per hundred rubber* | 0.276 sq. in. (circle) | Wood | 60/160 | 77 | 2800 |
| 77 | Aluminum foil (1. mil) was painted on both sides with polychloroprene-phenold cement*. | 0.276 sq. in. (circle) | Wood | 55/180 | 88 | 3180 |
| 78 | Aluminum foil (1.0 mil) was painted with polychloroprene-phenolic cement as above except for additin of 25 parts m-aminophenol per hundred rubber.* | 0.276 sq. in. | Wood | 55/180 | 96 | 3480 |

*A mill-mixed polychloroprene masterbatch containing 100 parts Neoprene AC (E. I. du Pont de Nemours & Co. Inc.) 2 parts phenyl-alpha naphthylamine, 4 parts magnesium oxide and 5 parts zinc oxide was dissolved in 360 parts toluene. To this was added a combination of 50 parts modified Novolac resin (Durez 12686, Hooker Chemical Corporation) dissolved in an equal weight of acetone and 4.1 parts hexamethylenetetramine dissolved in 47 parts chloroform. The cement was then divided into 2 equal portions, to the first of which (Examples 75 and 77) was added 50 parts acetone while to the second (Example 76 and 78) was added a solution of 12.5 parts m-aminophenol in 37.5 parts acetone.

Examples 79–82

Examples 79–82 are concerned with the adhesion of wood to wood by the use of paper tapes saturated with a combination of thermosetting resorcinol-formaldehyde resin and either vinylpyridine terpolymer elastomer (Examples 79 and 80) or butadiene-acrylonitrile 60 minutes at 160° C. and a pressure of at least 50 psi, sufficient to insure good contact.

After cooling, the specimens were tested for lap shear tensile strength as described for Examples 63068. The results of these tests, as presented in Table XXI, showed that after-treatment of the tapes with m-aminophenol resulted in improved adhesion.

TABLE XXI

Thermosetting RFL Adhesives on Paper Support
Improvement of Adhesion by After-Treatment of Tapes with m-Aminophenol

| Example No. | Preparation of Supported Adhesive | Area of Adhesion | Adherends | Cure of Laminate (min./° C.) | Lap Shear (Lb.) | Tensile (psi) |
|---|---|---|---|---|---|---|
| 79 | Strips of filter paper were dipped into RFL dip* containing vinylpyridine latex, and | .0276 sq. in. (circle) | wood | 60/160 | 82 | 2970 |

TABLE XXI-continued

Thermosetting RFL Adhesives on Paper Support
Improvement of Adhesion by After-Treatment of Tapes with m-Aminophenol

| Example No. | Preparation of Supported Adhesive | Area of Adhesion | Adherends | Cure of Laminate (min./° C.) | Lap Shear (Lb.) | Tensile (psi) |
|---|---|---|---|---|---|---|
| | were dried at about 27° C. | | | | | |
| 80 | A portion of treated paper from Example 79 was after-treated in dip of 0.5% m-aminophenol in acetone | .276 sq. in. (circle) | wood | 60/160 | 96 | 3480 |
| 81 | Strips of filter paper were dipped into RFL dip* containing butadiene-acrylonitrile latex and were dried at 27° C. | .0276 sq. in (circle) | wood | 60/160 | 75 | 2715 |
| 82 | A portion of treated paper from Example 81 was after-treated in dip of 0.5% m-aminophenol in acetone | .0276 sq. in (circle) | wood | 60/160 | 87 | 3150 |

*19.4 parts Penocolite R-2170 (75% aqueous solution of resorcinol-formaldehyde thermoplastic resin, Koppers Co. Inc.) were diluted with 120 parts 1% aqueous sodium hydroxide, and then 2.4 parts hexamethylenetetramine dissolved in 15 parts water were added. This solution was then divided into two equal portions to one of which 125 parts (50 parts solids) Gen-Tac latex (General Tire and Rubber Co.) were added, while to the other were added 117 parts (50 parts solids) Chemigum 245-CH5 (butadiene-acrylonitrile latex, Goodyear Tire and Rubber Co.).

Examples 83–85

Examples 83–85 are concerned with phenolic-polyamidepolychloroprene adhesives on paper tape support, and demonstrate the improvement of wood-to-wood adhesion by the addition of m-aminophenol to the cements used in preparing the tapes. They also demonstrate that acidifying the cement (in Examples 85) did not destroy the effectiveness of m-aminophenol.

In Examples 83, four parts of a thermoplastic phenolic resin (Durez 22193, Hooker Chemical Corp.) and four parts polyamide resin (Versamid 115, General Mills Inc.) were dissolved in 32 parts toluene and then 24 parts of a 25% solution of polychloroprene (Neoprene AC, E. I. du Pont de Nemours and Co. Inc.) were added.

To a portion of the cement of Example 83 m-aminophenol was added in the amount of 50 parts per hundred phenolic resin. This cement was used in Example 84.

The cement of Example 85 was prepared by adding to a portion of that of Example 84 glacial acetic acid in the amount of 50 parts per hundred phenolic resin, which was sufficient to render the solution definitely acid (about pH 5.0).

Each of the above cements was applied with a brush to both sides of a strip of filter paper, with one side being allowed to dry before the strip was turned over for the painting of the other side. When both sides of the strips of paper tape were thoroughly dry, 3/16 inch diameter circles were cut from them with a cork borer and placed between the over-lapping ends of flat wood sticks so that the circles of adhesive tape were approximately in the center of a one inch over-lap of the sticks. These assemblies were wrapped in aluminum foil to hold their members temporarily in place and then were laminated in a small laboratory press for 30 minutes at 160° C. after which the heat was shut off and the specimens were cooled under pressure sufficient to insure good contact (in excess of 60 psi) to about 80° C. before removal from the press.

After cooling, the specimens were tested for lap shear tensile strength as described for Examples 63–68. The data obtained in these tests, as presented in Table XXII, showed that the addition of m-aminophenol resulted in improved wood-to-wood adhesion.

TABLE XXII

Phenolic-Polyamide-Polychloroprene Adhesives on Paper Support
Improvement of Wood-to-Wood Adhesion by Addition of m-Aminophenol

| Example No. | Preparation of Supported Adhesive | Area of Adhesion | Adherends | Cure of Laminate (min./° C.) | Lap Shear Tensile Strength (lbs.) | (psi) |
|---|---|---|---|---|---|---|
| 83 | Strip of filter paper painted on both sides with phenolic-polyamide-polychloroprene cement* and dried at 27° C. | .0276 sq.in. (circle) | Wood | 60/160** | 55 | 1990 |
| 84 | Strip of filter paper painted on both sides with cement as above* except for addition of m-aminophenol in the amount of 50 parts per hundred resin as a 20% solution in methyl ethyl ketone | .0276 sq. in (circle) | Wood | 60/160** | 75 | 2715 |
| 85 | Strip of filter paper painted on both sides with cement as in Example 84 except for the addition of glacial acetic acid in the amount of 50 parts per hundred resin, which acidified the solution to about pH 5.0. | .0276 sq. in. (circle) | Wood | 60/160** | 71 | 2570 |

*4 parts of a polyamide resin (Versamid 115, General Mills Inc.) and 4 parts thermoplastic phenolic resin (Durez 22193, Hooker Chemical Corp.) were dissolved in 32 parts toluene. To this was added 24 parts of a 25% solution of polychloroprene (Neopreme AC, E. I. du Pont de Nemours & Co., Inc.) in toluene.
**Followed by cooling under pressure to 80° C. before opening press.

Examples 86 and 87

Examples 86 and 87 are concerned with penoplast-polychloroprene-hexamethylene-tetramine adhesives which were applied from solution to paper and dried to provide adhesive tapes for use in joining substrates in a press at elevated temperatures. The adhesive formulation of Example 87, which was identical to that of Example 86 except for the addition of m-aminophenol in methylethyl ketone, was found to provide improved wood-paper-wood adhesion.

In the preparation of these adhesives, 6 parts phenolic resin (Bakelite CKM1634, Union Carbide Corp.) and 15 parts polychloroprene (Neoprene AC, E. I. du Pont de Nemours and Co., Inc.) were dissolved in 51 parts toluene, and then a solution of 1.2 parts hexamethylenetetramine in 15 parts chloroform was added. One half of this cement without further additions was used in Example 86, while to the other half (Example 87) was added 1 part m-aminophenol dissolved in 10 parts methylethyl ketone.

These cements were painted onto both sides of strips of filter paper after which the strips of paper were dried at about 27° C. Circles 3/16 inch in diameter were then cut with a cork borer from the two coated papers, and each circle was placed between the over-lapped ends of two flat wooden sticks so that it was at about the midpoint of a one inch overlap of the sticks. These assemblies were wrapped in aluminum foil to hold their members temporarily in place and then were laminated in a small press for 30 minutes at 160° C., using enough pressure (in excess of 60 psi) to insure good contact. The heat was then shut off and the specimens cooled under pressure to 80° C. before the press was opened.

These adhesion test speciments, after cooling, were tested for lap shear tensile strength by the method described for Examples 63–68. The results of these tests, as presented in Table XXIII showed that the addition of m-aminophenol to the adhesive formulation resulted in improved adhesion.

acrylonitrile elastomer latex where the RFL dips were used in the preparation of papersupported adhesive tapes.

In preparing the RFL-dips, 12.8 parts resorcinol were dissolved in 100 parts 1% aqueous sodium hydroxide solution, then 19 parts 37% formalin were added and this mixture was allowed to age for 2½ hours at about 27° C. before the addition of 150 parts carboxyl-modified NBR latex (Hycar 1570 X 20, B. F. Goodrich Chemical Co.) containing 60 parts solids. This dip was then divided into two equal portions, to the first of which (Example 88) were added 50 parts water, while to the second (Example 89) was added a solution of 3 parts m-aminophenol in 47 parts water.

Strips of filter paper were then dipped into each of the above dispersions and dried 24 hours at about 21° C. Circles of 3/16 inch diameter were cut from each of these strips and placed between the over-lapped ends of flat wooden sticks so that the circles of adhesive tape were about in the center of a one inch overlap of the sticks. Aluminum foil was wrapped around these assemblies to hold their members temporarily in place and then they were laminated together in a small laboratory press for 60 minutes at 160° C. and a pressure sufficient to insure good contact (at least 60 psi).

The cured adhesive specimens, after cooling, were tested for lap shear strength as previously described for Examples 63–68. The results, as presented in Table XXIV, showed that the adhesion of Examples 89, in

TABLE XXIII

HEAT-CURABLE PHENOPLAST-POLYCHLOROPRENE ADHESIVES ON PAPER CARRIER
IMPROVEMENT OF ADHESION BY ADDITION OF M-AMINOPHENOL TO ADHESIVE

| Example No. | Preparation of Carrier Supported Adhesive | Area of Adhesion | Adherends | Cure of Laminates min./° C. | Lap Shear Tensile Strength | |
|---|---|---|---|---|---|---|
| | | | | | lb. | psi |
| 86 | Strips of filterpaper were painted with cement containing polychloroprene, thermoplastic phenolic resin, and hexamethylene tetramine,* and dried at 27° C. | .0276 sq. in. (circle) | wood | 60/160** | 73 | 2655 |
| 87 | Strips of filter paper were printed with cement as above except for the addition of m-aminophenol,* and dried at 27° C. | .0276 sq. in. (circle) | wood | 60/160** | 84 | 3040 |

*6 parts phenolic resin (Bakalite CKM 1634, Union Carbide Corp.) and 15 parts polychloroprene (Neoprene AC, E. I. du Pont de Nemours & Co., Inc.) were dissolved in 51 parts toluene, and then a solution of 1.2 parts hexamethylenetetramine in 15 parts chloroform was added. One half of this cement was used in Example 85, while to the other half (Example 86) was added 1 part m-aminophenol dissolved in 10 parts methylethyl ketone.
**Followed by cooling under pressure to 80° C. before opening press.

Examples 88 and 89

Examples 88 and 89 demonstrate improvement of adhesion obtained by adding m-aminophenol to RFL dips containing a carboxyl-modified butadiene- which m-aminophenol was added to the RFL dip, was superior to that of Example 88 without m-aminophenol.

TABLE XXIV

Carboxyl-Modified NBR Latex in RFL Adhesive on Paper Support
Improvement of Adhesion by Addition of m-Aminophenol to RFL Dip

| Example No. | Preparation of Supported Adhesive | Area of Adhesion | Adherends | Cure of Laminates (min./° C.) | Lap Shear Tensile Strength | |
|---|---|---|---|---|---|---|
| | | | | | (lbs.) | (psi) |
| 88 | Filter paper dipped in mixture of 141 parts RFL dip** (containing 30 parts carboxyl-modified NBR rubber and 10 parts RF resin) and 50 parts water, then dried 24 hours at about 21° C. | .0276 sq. in (circle) | Wood | 60/160 | 73 | 2640 |
| 89 | Filter paper dipped in mixture of 141 parts RFL dip** (containing 30 parts carboxyl-modified NBR rubber and 10 parts RF resin) and a solution of 3 parts m-aminophenol in 47 parts warm water, then dried 24 hours at about 21° C. | .0276 sq.in. (circle) | Wood | 60/160 | 81 | 2940 |

**A resorcinol-formaldehyde (RF) resin was prepared by dissolving 12.8 parts resorcinol in 100 parts 1% aqueous sodium hydroxide solution, and adding 19 parts 37% formalin. This was allowed to age for 2½ hours, then 150 parts carboxyl-modified NBR latex (Hycar 1570 × 20, B. F. Goodrich Chemical Co.) were added.

Examples 90 and 91

In Examples 90 and 91, paper-supported adhesive tapes were prepared by dipping strips of filter paper into solutions of a heat-reactive bromo-methyl alkylated, phenolformaldehyde resin (SP-1055 Resin, Schenectady Chemicals Inc.).

A master solution of the resin was first prepared by dissolving 20 parts of the resin in 20 parts each toluene and acetone and then was divided into two equal portions of 30 parts each. To one (Example 90) were aded 30 parts acetone, while to the other (Example 91) was added a solution of 3 parts m-aminophenol in 27 parts acetone. The strips of filter paper dipped in these solutions were dried at about 21° C. for 20 hours.

Circles of 3/16 inch diameter were then cut from the paper tapes and were placed between the over-lapping ends of flat wooden sticks so that they were about in the center of a one inch over-lap of the sticks. Aluminum foil was wrapped around these assemblies to hold their members temporarily in place and then they were laminated together in a small laboratory press for 60 minutes at 160° C. and a pressure sufficient to insure good contact (in excess of 60 psi).

The cured adhesive specimens, after cooling, were tested for lap shear strength as described for Examples 63-68. The results of these tests, presented in Table XXV showed that the specimen of Example 91 in which the adhesive contained m-aminophenol was superior to that of Example 90 in which no aminophenol was added to the adhesive resin.

Examples 92 and 93

Examples 92 and 93 are concerned with thermosetting adhesive formulations containing a novolak phenolic resin and hexamethylenetetramine, and they demonstrate that improved adhesion was obtained by the addition of m-aminophenol to the basic formulation.

The adhesives were prepared ad applied to paper supports as follows: 47 parts cashew nut shell oil modified phenolic resin (Duoz 12686, Hooker Chemical Corporation) were dissolved in an equal weight of acetone, and to this solution was added 3.8 parts hexamethylenetetramine dissolved in 50 parts chloroform. This solution was then divided into two equal parts, to the first of which (Example 92) were added 60 parts acetone, while to the second (Example 93) were added a solution of 6 parts m-aminophenol in 54 parts acetone. Strips of filter paper were dipped into each of these solutions and dried 24 hours at about 21° C.

Circles of 3/16 inch diameter were cut from both strips and placed between the overlapped ends of flat wooden sticks so that the circles were about in the center of a one-inch overlap of the sticks. Aluminum foil was wrapped around these assemblies to hold their members temporarily in place and then they were laminated in a small laboratory press for 60 minutes at 160° C. and a pressure in excess of 60 psi, sufficient to insure good contact.

The laminates, after cooling, were then tested for lap shear strength as previously described for Examples 63–68. The results of these tests are present in Table XXVI.

TABLE XXV

A Phenol Formaldehyde Resin Containing Bromine as an Adhesive for Wood
Improvement of Adhesion by Addition of m-Aminophenol

| Example No. | Preparation of Adhesive Tape | Area of Adhesion | Adherends | Cure of Laminates (min./° C.) | Lap Shear Tensile Strength (Lbs.) | (psi) |
|---|---|---|---|---|---|---|
| 90 | A strip of filter paper was dipped in a combination of 30 parts 33⅓% solution* of a phenol formaldehyde resin containing bromine and 30 parts acetone, followed by drying 20 hours at about 21° C. | .0276 sq. in (circle) | Wood | 60/160 | 60 | 2180 |
| 91 | A strip of filter paper was dipped in a combination of 30 parts 33⅓% solution* of a phenol formaldehyde resin containing bromine and a solution of 3 parts m-aminophenol in 27 parts acetone followed by drying 20 hours at about 21° C. | .0276 sq. in (circle) | Wood | 60/160 | 79 | 2860 |

*A solution of 20 parts of a heat-reactive bromo-methyl alkylated, phenol formaldehyde resin (SP-1055 Resin, Schenectady Chemicals Inc.) in 20 parts acetone and 20 parts toluene.

TABLE XXVI

Supported Adhesive Films Containing a Phenolic Novolak Resin and Hexamethylenetetramine
Improvement of Adhesion by Addition of m-Aminophenol

| Example No. | Preparation of Supported Adhesive | Area of Adhesion | Adherends | Cure of Laminates min./° C. | Lap Shear Tensile Strength Lb. | psi |
|---|---|---|---|---|---|---|
| 92 | Strips of filter paper were dipped into a combination of 73.9 parts of a solution of a phenolic novolak resin and hexamethylenetetramine* and 60 parts acetone, then were dried 24 hours at about 21° C. | .0276 sq. in. (circle) | Wood | 60/160° C. | 45 | 1630 |
| 93 | Strips of filter paper were dipped into a combination of 73.9 parts of a solution of a phenolic novolak resin and hexamethylenetetramine* and a solution of 6 part m-aminophenol in 54 parts acetone, and then were | .0276 sq. in. | Wood | 60/160° C. | 74 | 2680 |

TABLE XXVI-continued

Supported Adhesive Films Containing a Phenolic Novolak Resin and Hexamethylenetetramine
Improvement of Adhesion by Addition of m-Aminophenol

| Example No. | Preparation of Supported Adhesive | Area of Adhesion | Adherends | Cure of Laminates min./° C. | Lap Shear Tensile Strength Lb. psi |
|---|---|---|---|---|---|
| | dried 24 hours at about 21° C. | | | | |

*47 parts cashew nut shell oil modified novolak phenolic resin (Duoz 12686, Hooker Chemical Corporation) were dissolved in 47 parts acetone and then combined with a solution of 3.8 parts hexamethylenetetramine in 50 parts chloroform.

As is shown by the results set out in Table XXVI and earlier tables, the inclusion of m-aminophenol greatly improves the bond in adhesives prepared from movolacs and other phenoplasts and modified phenoplasts curable by, and cured with, hexamethylenetetramine at elevated temperatures.

It will further be appreciated by those skilled in the art that in practicing the present invention, the adhesive compositions may include fillers, coloring ingredients, and other additives which do not prevent the attaining of advantages of use of the promoter of the present invention. Such fillers for example are set forth in Carswells Treatise on "Phenoplasts" above referred to, and in the "Handbook of Adhesives" by Irving Shiest, Reinhold (1962), herein incorporated by reference.

While there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

1. An improved adhesive composition for bonding substrates to one another, said adhesive composition being a liquid dispersion comprising, by weight, the combination of:
    a. 5 to 250 parts of liquid dispersing medium,
    b. 10 parts of phenoplast material selected from the members of the class consisting of group (I) that heat curable phenoplasts containing methylol groups; group (II), mixtures of (1) novolac phenoplasts substantially free from methylol groups with (2) at least sufficient methylene donor material to enable heat curing of the same; group (III) mixtures of (1) phenoplasts which complex with metal oxides with (2) at least sufficient material selected from the oxides and hydroxides of the metals calcium, magnesium and zinc, to complex with the phenoplast; and group (IV) heat curable combinations of the foregoing,
    c. 0 to 150 parts of modifying polymer, and
    d. 0 to 30 parts of material selected from the oxides and hydroxides of the metals calcium, magnesium, and zinc,
and said composition being improved in that it has mixed therein
    e. 1 to 40 parts by weight of m-aminophenol.

2. An improved composition as claimed in claim 1, wherein the liquid dispersing medium of the combination is volatile and comprises one or more members of the group consisting of volatile organic solvents and water.

3. An improved composition as claimed in claim 1, wherein the phenoplast materials consists essentially of resorcinol-formaldehyde resin.

4. An improved composition as claimed in claim 1, wherein the phenoplast material consists essentially of material selected from group (I).

5. An improved composition as claimed in claim 1, wherein the phenoplast material consists essentially of material selected from group (II).

6. An improved composition as claimed in claim 1, wherein the modifying polymer is present and consists essentially of elastomer at least 5 parts.

7. An improved composition as claimed in claim 6, wherein the elastomer is selected from the class consisting of natural rubber; polybutadiene; polyisoprene; polychloroprene; butadiene/acrylonitrile, butadiene/vinyl pyridene, butadiene/styrene/vinyl pyridene, butadiene/styrene, isobutylene/isoprene, and other hydrocarbon diene/vinylidene interpolymers; ethylene/propylene and other alpha olefin polymers and interpolymers; the foregoing polymers and interpolymers provides with carboxyl groups; and combinations of two or more of the foregoing.

8. An adhesive material for bonding substrates to one another, said adhesive material consisting essentially of
    a. a liquid vehicle, and carried thereby, dry basis by weight, a mixture of
    b. 10 parts of heat curable phenoplast,
    c. 0 to 150 parts of elastomer,
    d. 0 to 50 parts of inorganic material selected from the oxides and hydroxides of the metals calcium, magnesium and zinc, and
    e. 1 to 40 parts of m-aminophenol.

9. An adhesive material as claimed in claim 8, wherein said vehicle is selected from the class consisting of volatile liquids.

10. An aqueous adhesive composition comprising a mixture, dispersed in the aqueous phase, dry basis by weight, of
    a. 1 part phenoplast resin,
    b. from 0 to 2 parts epoxy resin,
    c. from 0 to 15 parts elastomer latex and
    d. from 0.2 to 4.0 parts m-aminophenol.

11. An aqueous adhesive composition as claimed in claim 10, said composition comprising a mixture, dispersed in the aqueous phase, dry basis by weight, of
    a. 1 part resorcinol-formaldehyde resin,
    b. from 0 to 2 parts epoxy resin,
    c. from 0.5 to 15 parts vinylpyridine latex, and
    d. from 0.2 to 4.0 parts m-aminophenol.

12. An aqueous adhesive composition as claimed in claim 10, comprising a mixture dispersed in the aqueous phase, dry basis by weight, of
    a. 1 part phenoplast resin,
    b. from 0.2 to 2 parts epoxy resin,
    c. from 0 to 15 parts elastomer latex, and
    d. from 0.2 to 4.0 parts m-aminophenol.

13. An aqueous adhesive composition as claimed in claim 10, said composition comprising a mixture, dispersed in the aqueous phase, dry basis by weight, of
 a. 1 part resorcinol-formaldehyde resin,
 b. from 0.2 to 2 parts epoxy resin,
 c. from 0.5 to 15 parts vinylpyridine latex, and
 d. from 0.2 to 4.0 parts m-aminophenol.

14. An adhesive material for bonding substrates to one another, said adhesive material consisting essentially of
 a. a liquid vehicle, and carried thereby, dry basis by weight, a mixture of
 b. 10 parts of heat curable phenoplast,
 c. 0 to 150 parts of elastomer,
 d. 0 to 50 parts of inorganic material selected from the oxides and hydroxides of the metals calcium, magnesium and zinc,
 e. 0 to 40 parts of methylene donor material, and
 f. 1 to 40 parts of m-aminophenol.

15. An adhesive material for bonding substrates to one another, said adhesive material consisting essentially of
 a. a liquid vehicle, and carried thereby, dry basis by weight, a mixture of
 b. 10 parts of curable phenoplast,
 c. 0 to 150 parts of elastomer,
 d. 0 to 50 parts of inorganic material selected from the oxides and hydroxides of the metals calcium, magnesium and zinc,
 e. 1 to 40 parts of hexamethylenetetramine, and
 f. 1 to 40 parts of m-aminophenol.

* * * * *

UNITED STATES PATENT OFFICE
CERTIFICATE OF CORRECTION

PATENT NO. : 4012350
DATED : March 15, 1977
INVENTOR(S) : Oliver W. Burke Jr et al It is certified that error appears in the above-identified patent and that said Letters Patent are hereby corrected as shown below:

(1) Col. 11, line 15, after "tion" read the footnotes (6) and (7) appearing in the same column at line 41 through "dried." in line 47 1/2.

(2) Col. 11, line 25, for "are" read --and--

(3) Col. 11, line 40, for "showing...continued" read --showing by-- and continue the main text at "comparison" in line 47 1/2.

(4) Col. 13, line 51, for "the" read --then--

(5) Col. 16, line 11, for "Table Ii" read --Table II--

(6) Col. 23, after "hours" in line 28, conclude the footnote with "A." on line 28 1/2, and continue with main text at "before" in line 28 1/2, starting new paragraphs with "2." in line 29 and with "3" in line 53.

(7) Col. 24, start a new paragraph with "6." in line 1.

(8) Col. 36, line 26, add the footnote --(1) See footnote (3), Table XIV--

(9) Col. 49, above line 39, read --claims:--

Signed and Sealed this

Twenty-second Day of January 1980

[SEAL]

Attest:

SIDNEY A. DIAMOND

Attesting Officer　　Commissioner of Patents and Trademarks